(12) United States Patent
Fogleman et al.

(10) Patent No.: US 12,318,677 B2
(45) Date of Patent: Jun. 3, 2025

(54) METHODS, DEVICES, AND SYSTEMS FOR FACILITATING UMPIRES OFFICIATING A BASEBALL GAME

(71) Applicant: UStopIt, Inc., Raleigh, NC (US)

(72) Inventors: Keith David Fogleman, Raleigh, NC (US); Edward Clarke Prather, Hendersonville, NC (US)

(73) Assignee: UStopIt, Inc., Raleigh, NC (US)

( * ) Notice: Subject to any disclaimer, the term of this patent is extended or adjusted under 35 U.S.C. 154(b) by 0 days.

(21) Appl. No.: 18/895,880

(22) Filed: Sep. 25, 2024

(65) Prior Publication Data

US 2025/0018269 A1    Jan. 16, 2025

Related U.S. Application Data

(63) Continuation-in-part of application No. PCT/US2024/024192, filed on Apr. 12, 2024.

(60) Provisional application No. 63/495,582, filed on Apr. 12, 2023.

(51) Int. Cl.
*A63B 71/06* (2006.01)
*A63B 71/02* (2006.01)

(52) U.S. Cl.
CPC .......... *A63B 71/0619* (2013.01); *A63B 71/02* (2013.01); *A63B 71/0669* (2013.01)

(58) Field of Classification Search
None
See application file for complete search history.

(56) References Cited

U.S. PATENT DOCUMENTS

| | | |
|---|---|---|
| 6,369,697 B1 | 4/2002 | Poole |
| 2004/0184354 A1 | 9/2004 | McDonald |

(Continued)

FOREIGN PATENT DOCUMENTS

WO    WO2024215971 A2 * 10/2024 ............. A63B 71/06

OTHER PUBLICATIONS

MLB, "Pitch Timer (2023 rule change)", pp. 1-2, Dec. 18, 2022, Retrieved Nov. 6, 2024, <https://www.mlb.com/glossary/rules/pitch-timer> (Year: 2022).*

(Continued)

*Primary Examiner* — Jay Trent Liddle
*Assistant Examiner* — Alyssa N Brandley
(74) *Attorney, Agent, or Firm* — NK Patent Law

(57) ABSTRACT

Disclosed herein are methods, devices, and systems for facilitating umpires officiating a baseball game. According to one embodiment, a mobile device is disclosed for facilitating an umpire of a baseball game. The mobile device includes a processor, a memory electrically coupled with the processor, a user interface electrically coupled with the processor, a haptic feedback device electrically coupled with the processor, and a wireless transceiver electrically coupled with the processor. The processor is configured for (1) receiving a start pitch clock selection via the user interface; (2) upon receiving the start pitch clock selection via the user interface, transmitting a start pitch clock device message via the wireless transceiver to an access point; (3) receiving a start pitch clock access point acknowledgment message from the access point; and (4) upon receiving the start pitch clock access point acknowledgment message, momentarily activating the haptic feedback device.

27 Claims, 9 Drawing Sheets

(56) References Cited

U.S. PATENT DOCUMENTS

| | | | | |
|---|---|---|---|---|
| 2005/0064961 A1* | 3/2005 | Sigler | ............... | A63C 19/00 |
| | | | | 473/468 |
| 2012/0170427 A1 | 7/2012 | Saunders et al. | | |
| 2022/0416821 A1 | 12/2022 | Hankins et al. | | |
| 2023/0158391 A1* | 5/2023 | Padula | ............ | A63B 71/0622 |
| 2023/0381629 A1* | 11/2023 | Beal | ............... | A63B 71/0669 |

OTHER PUBLICATIONS

MLB, "Warmup Pitches", p. 1, Jan. 19, 2021, Retrieved Nov. 6, 2024, <https://web.archive.org/web/20210119135638/https://www.mlb.com/glossary/rules/warmup-pitches> (Year: 2021).*

ISA/US; International Search Report and Written Opinion for corresponding PCT Patent Application No. PCT/US2024/024192, mailed Aug. 7, 2024, 13 pages.

Fisher, Eric; "MLB rule changes spark technology additions for ballparks", Stadium Tech Report, Retrieved from the Internet <URL: https://stadiumtechreport.com/feature/mlb-rule-changes-spark-technology-additions-forballparks/>, published Mar. 30, 2023, 4 pages.

* cited by examiner

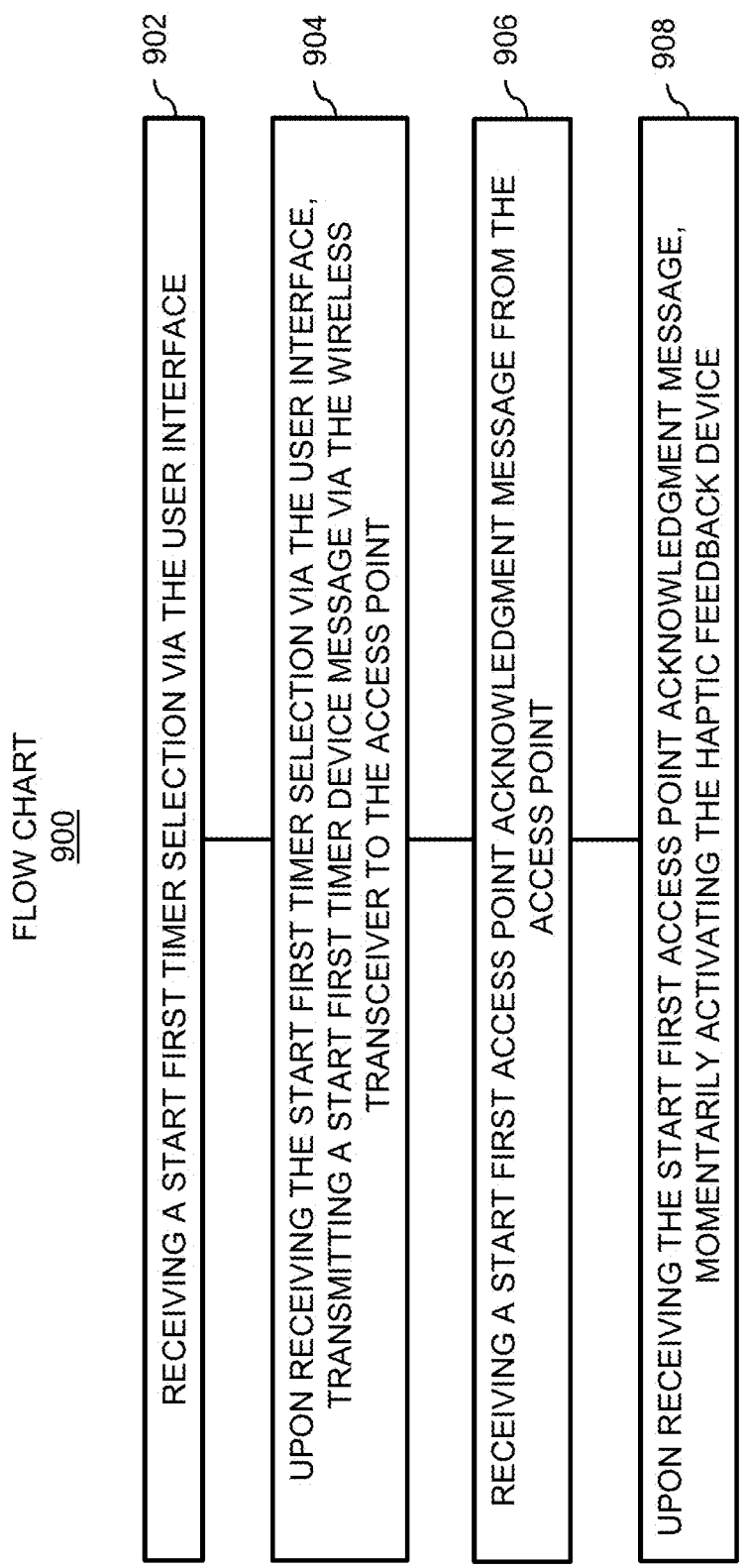

METHODS, DEVICES, AND SYSTEMS FOR FACILITATING UMPIRES OFFICIATING A BASEBALL GAME

PRIORITY CLAIM

This application is a continuation-in-process application of PCT Patent Application No. PCT/US2024/024192 entitled "IMPROVED METHODS, DEVICES, AND SYSTEMS FOR FACILITATING UMPIRES OFFICIATING A BASEBALL GAME," which was filed on Apr. 12, 2024, which claims benefit of and priority to U.S. Provisional Patent Application Ser. No. 63/495,582, titled "IMPROVED METHODS, DEVICES, AND SYSTEMS FOR FACILITATING UMPIRES OFFICIATING A BASEBALL GAME," filed Apr. 12, 2023, the contents of both of which are incorporated by reference herein.

TECHNICAL FIELD

The present invention relates to a mobile device and more specifically to methods, devices, and systems for facilitating umpires officiating a baseball game.

BACKGROUND

Umpires have many duties and responsibilities before, during, and even after a baseball game. Umpires must have a thorough understanding of the given rules that may have variation over high school, collegiate, and professional games. Umpires must observe game play closely and make calls based on the application of the given rules and assess any required penalties. On a contested play, they must consult with other umpires and/or playback screens to make a final call. Umpires must resolve rule infraction claims and complaints from both players and coaches. Additionally, they may be required to verify credentials of both teams (players and coaches) and ensure both teams follow all safety regulations. As such, umpires must have excellent negotiation and problem solving skills with the ability to make quick (and sound) decisions. They must act with integrity and accuracy while performing their duties under pressure.

Accordingly, a need exists for better solutions to facilitate umpires of baseball games.

SUMMARY

The presently disclosed subject matter is directed toward methods, devices, and systems for facilitating umpires officiating a baseball game.

According to one embodiment, a mobile device is disclosed for facilitating an umpire of a baseball game. The mobile device includes a processor, a memory electrically coupled with the processor, a user interface electrically coupled with the processor, a haptic feedback device electrically coupled with the processor, and a wireless transceiver electrically coupled with the processor. The processor is configured for (1) receiving a start pitch clock selection via the user interface; (2) upon receiving the start pitch clock selection via the user interface, transmitting a start pitch clock device message via the wireless transceiver to an access point; (3) receiving a start pitch clock access point acknowledgment message from the access point; and (4) upon receiving the start pitch clock access point acknowledgment message, momentarily activating the haptic feedback device (e.g., using a unique pitch clock start vibration pattern). The access point is electrically coupled with a scoreboard controller. Additionally, the access point is configured for starting an external pitch clock timer on the scoreboard controller upon receiving the start pitch clock device message and/or starting an internal pitch clock timer within the access point upon receiving the pitch clock device message.

In some embodiments, upon receiving the start pitch clock device message the access point may be further configured for resetting the external pitch clock timer on the scoreboard controller prior to starting the external pitch clock timer and/or resetting the internal pitch clock timer within the access point prior to starting the internal pitch clock timer.

In some embodiments, the processor may be further configured for receiving a reset pitch clock selection via the user interface; upon receiving the reset pitch clock selection via the user interface, transmitting a reset pitch clock device message via the wireless transceiver to the access point; receiving a reset pitch clock access point acknowledgment message from the access point; and upon receiving the reset pitch clock access point acknowledgment message, momentarily activating the haptic feedback device (e.g., using a unique pitch clock reset vibration pattern). The access point may be further configured for resetting the external pitch clock timer on the scoreboard controller upon receiving the reset pitch clock device message and/or resetting the internal pitch clock timer within the access point upon receiving the pitch clock device message.

In some embodiments, the processor may be further configured for receiving an increment ball count selection via the user interface; upon receiving the increment ball count selection via the user interface, transmitting an increment ball count device message via the wireless transceiver to the access point; receiving an increment ball count access point acknowledgment message from the access point; and upon receiving the increment ball count access point acknowledgment message, momentarily activating the haptic feedback device (e.g., using a unique ball count increment vibration pattern). Additionally, the access point may be further configured for incrementing a ball count on the scoreboard controller upon receiving the increment ball count device message.

In some embodiments, the processor may be further configured for receiving an increment strike count selection via the user interface; upon receiving the increment strike count selection via the user interface, transmitting an increment strike device message via the wireless transceiver to the access point; receiving an increment strike count access point acknowledgment message from the access point; and upon receiving the increment strike count access point acknowledgment message, momentarily activating the haptic feedback device (e.g., using a unique strike count increment vibration pattern). Additionally, the access point may be further configured for incrementing a strike count on the scoreboard controller upon receiving the increment strike count device message.

In some embodiments, the processor may be further configured for receiving a batter-must-be-in-box message from the access point; and momentarily activating the haptic feedback device (e.g., using a unique batter-must-be-in-box vibration pattern) upon receiving the batter-must-be-in-box message. Additionally, the batter-must-be-in-box message may be transmitted from the access point based on a first time interval after receiving the start pitch clock device message. In further embodiments, the first time interval may be approximately ten seconds.

In some embodiments, the user interface may include a pitch-clock momentary switch. The processor may be further configured for receiving the start pitch clock selection via the pitch-clock-momentary switch. The first time interval may be associated with a league pitch clock time requirement.

In other embodiments, the user interface may include a no-runners-on-base-pitch-clock momentary switch and a runners-on-base-pitch-clock momentary switch. The processor may be further configured for receiving the start pitch clock selection via either the no-runners-on-base-pitch-clock-momentary switch or the runners-on-base-pitch-clock momentary switch. Upon receiving the start pitch clock selection via the no-runners-on-base-pitch-clock-momentary switch, the first time interval may become associated with a league no-runners-on-base pitch clock time requirement. Upon receiving the start pitch clock selection via the runners-on-base-pitch-clock-momentary switch, the first time interval may become associated with a league runners-on-base pitch clock time requirement.

In some embodiments, the processor may be further configured for receiving a pitch clock expiration message from the access point; and momentarily activating the haptic feedback device (e.g., using a unique pitch clock expiration vibration pattern) upon receiving the pitch clock expiration message. Additionally, the pitch clock expiration message may be transmitted from the access point based on a second time interval after receiving the start pitch clock device message. In further embodiments, the second time interval may be approximately twenty seconds. Additionally, second time interval may also be associated with a league pitch clock time requirement. The second time interval may be associated with a league no-runners-on-base pitch clock time requirement or a league runners-on-base pitch clock time requirement.

In some embodiments, the processor may be further configured for receiving a start between-inning clock selection via the user interface; upon receiving the start between-inning clock selection via the user interface, transmitting a start between-inning clock device message via the wireless transceiver to the access point; receiving a start between-inning clock access point acknowledgment message from the access point; and upon receiving the start between-inning clock access point acknowledgment message, momentarily activating the haptic feedback device (e.g., using a unique between-inning start clock vibration pattern). Additionally, the access point may be further configured for starting an external between-inning clock timer on the scoreboard controller upon receiving the start between inning clock device message and/or starting an internal between-inning clock timer within the access point upon receiving the start between inning clock device message.

In some embodiments, the processor may be further configured for receiving a between-inning warning message from the access point; and momentarily activating the haptic feedback device (e.g., using a unique warning between-inning vibration pattern) upon receiving the between-inning warning message. Additionally, the between-inning warning message may be transmitted from the access point based on a third time interval after receiving the start between-inning clock device message. In further embodiments, the third time interval may be approximately ninety seconds.

In some embodiments, the user interface may include a between-inning clock momentary switch. The processor may be further configured for receiving the start between-inning clock selection via between-inning clock momentary switch. The third time interval may be associated with a league between-inning clock time requirement.

In some embodiments, the processor may be further configured for receiving a between-inning expiration message from the access point; and momentarily activating the haptic feedback device (e.g., using a unique expiration between inning vibration pattern) upon receiving the between-inning expiration message. Additionally, the between-inning expiration message may be transmitted from the access point based on a fourth time interval after receiving the start between-inning clock device message. In further embodiments, the fourth time interval may be approximately one hundred twenty seconds. The fourth interval may also be associated with a league between-inning clock time requirement.

In some embodiments, the processor may be further configured for receiving a start between-batter clock selection via the user interface and transmitting a start between-batter clock device message via the wireless transceiver to the access point upon receiving the start between-batter clock selection. The processor may be further configured for receiving a start between-batter clock access point acknowledgment message from the access point and upon receiving the start between-batter clock access point acknowledgment message, momentarily activating the haptic feedback device (e.g., using a unique between-batter start clock vibration pattern). The access point may be further configured for starting an external between-batter clock timer on the scoreboard controller upon receiving the start between-batter clock device message and starting an internal between-batter clock timer within the access point upon receiving the start between-batter clock device message.

In some embodiments, the processor the processor may be further configured for receiving a between-batter warning message from the access point and momentarily activating the haptic feedback device (e.g., using a unique warning between-batter vibration pattern) upon receiving the between-inning warning message. The between-inning warning message may be transmitted from the access point based on a fifth time interval after receiving the start between-batter clock device message.

In some embodiments, the user interface may include a between-batter clock momentary switch and the processor may be further configured for receiving the start between-batter clock selection via between-batter clock momentary switch. The fifth time interval may be associated with a league between-batter clock time requirement.

In some embodiments, the processor may be further configured for receiving a between-batter expiration message from the access point and momentarily activating the haptic feedback device (e.g., using a unique expiration between-batter vibration pattern) upon receiving the between-inning expiration message. The between-batter expiration message may be transmitted from the access point based on a sixth time interval after receiving the start between-batter clock device message. The sixth interval may be associated with a league between-batter clock time requirement.

In some embodiments, the user interface may include a push button.

In some embodiments, the user interface may include a graphical user interface (GUI). In further embodiments, the GUI may include a touch pad display.

In some embodiments, the mobile device may further include a belt clip.

In some embodiments, the mobile device may further include a rechargeable battery. In further embodiments, the rechargeable battery may be a lithium-ion rechargeable battery.

In some embodiments, the mobile device may further include a charging port electrically coupled with the rechargeable battery. In further embodiments, the charging port may be compliant to a universal serial bus (USB) charger.

In other embodiments, the charging port may be a wireless charging port.

In certain embodiments, the wireless transceiver may be a wide-band direct sequence spread spectrum (WBDSSS) wireless transceiver. In further embodiments, the WBDSSS wireless transceiver may be configured to transmit and receive signals within a 902 megahertz (MHz) to 928 MHz frequency band.

In another embodiment, a method is implemented on a mobile device for facilitating an umpire of a baseball game. The mobile device includes a processor, a memory electrically coupled with the processor, a user interface electrically coupled with the processor, a haptic feedback device electrically coupled with the processor, and a wireless transceiver electrically coupled with the processor. The method includes (1) receiving a start pitch clock selection via the user interface; (2) upon receiving the start pitch clock selection via the user interface, transmitting a start pitch clock device message via the wireless transceiver to an access point; (3) receiving a start pitch clock access point acknowledgment message from the access point; and (4) upon receiving the start pitch clock access point acknowledgment message, momentarily activating the haptic feedback device. The access point is electrically coupled with a scoreboard controller. Additionally, the access point is configured for starting an external pitch clock timer on the scoreboard controller upon receiving the start pitch clock device message and/or starting an internal pitch clock timer with the access point upon receiving the pitch clock device message.

In another embodiment, a non-transitory computer-readable storage medium is disclosed. The non-transitory computer-readable medium stores instructions to be implemented on a mobile device for facilitating an umpire of a baseball game. The instructions when executed by a processor cause the mobile device to perform a method. The method includes (1) receiving a start pitch clock selection via the user interface; (2) upon receiving the start pitch clock selection via the user interface, transmitting a start pitch clock device message via the wireless transceiver to an access point; (3) receiving a start pitch clock access point acknowledgment message from the access point; and (4) upon receiving the start pitch clock access point acknowledgment message, momentarily activating the haptic feedback device. The access point is electrically coupled with a scoreboard controller. Additionally, the access point is configured for starting an external pitch clock timer on the scoreboard controller upon receiving the start pitch clock device message and/or starting an internal pitch clock timer with the access point upon receiving the start pitch clock device message.

In another embodiment, an access point for facilitating a plurality of umpires of a baseball game is disclosed. The access point includes a processor, a memory electrically coupled with the processor, a user interface electrically coupled with the processor, a scoreboard controller interface electrically coupled with the processor, and a wireless transceiver electrically coupled with the processor. The wireless transceiver is configured for transmitting and receiving signals from a plurality of mobile devices operated by the plurality of umpires. The processor is configured for (1) receiving a start pitch clock device message via the wireless transceiver from each mobile device of the plurality of mobile devices; and (2) upon receiving the start pitch clock device message from any one of the plurality of mobile devices, transmitting a start pitch clock access point acknowledgment message via the wireless transceiver to the plurality of mobile devices, and each mobile device of the plurality of mobile devices is configured for momentarily activating a haptic feedback device upon receiving the start pitch clock access point acknowledgment message. Additionally, the processor is further configured for starting an external pitch clock timer on the scoreboard controller via the scoreboard controller upon receiving the start pitch clock device message, and/or starting an internal pitch clock timer within the access point upon receiving the start pitch clock device message.

In some embodiments, the start pitch clock device message and the external pitch clock timer may be associated with a league pitch clock time requirement. In further embodiments, the start pitch clock device message and the external pitch clock timer may be further associated with a league no-runners-on-base pitch clock time requirement and/or a league runners-on-base pitch clock time requirement.

In some embodiments, the start pitch clock device message and the internal pitch clock timer may be associated with a league pitch clock time requirement. In further embodiments, the start pitch clock device message and the internal pitch clock timer may be further associated with a league no-runners-on-base pitch clock time requirement and/or a league runners-on-base pitch clock time requirement.

In some embodiments, upon receiving the start pitch clock device message the processor is further configured for resetting the external pitch clock timer on the scoreboard controller prior to starting the external pitch clock timer and/or resetting the internal pitch clock timer within the access point prior to starting the internal pitch clock timer.

In some embodiments, the processor may be further configured for receiving a reset pitch clock device message via the wireless transceiver from each mobile device of the plurality of mobile devices; upon receiving the reset pitch clock device message from any one of the plurality of mobile devices, transmitting a reset pitch clock access point acknowledgment message via the wireless transceiver to the plurality of mobile devices, wherein each mobile device of the plurality of mobile devices is configured for momentarily activating their haptic feedback device upon receiving the reset pitch clock access point acknowledgment message. Additionally, the processor may be further configured for resetting the external pitch clock timer on the scoreboard controller via the scoreboard controller upon receiving the reset pitch clock device message and/or resetting the internal pitch clock timer within the access point upon receiving the reset pitch clock device message.

In some embodiments, the processor may be further configured for receiving a start between-inning clock device message via the wireless transceiver from each mobile device of the plurality of mobile devices; upon receiving the start between-inning clock device message from any one of the plurality of mobile devices, transmitting a start between-inning clock access point acknowledgment message via the wireless transceiver to the plurality of mobile devices, wherein each mobile device of the plurality of mobile devices is configured for momentarily activating their haptic feedback device upon receiving the start between-inning clock access point acknowledgment message. Additionally, the processor may be further configured for starting an external between-inning clock timer on the scoreboard controller via the scoreboard controller interface upon receiving the start between-inning clock device message and/or starting an internal between-inning clock timer within the access point upon receiving the start between-inning clock device message.

In some embodiments, the processor may be further configured for receiving an increment ball count device message via the wireless transceiver from each mobile device of the plurality of mobile devices; upon receiving the increment ball count device message from any one of the plurality of mobile devices, transmitting an increment ball count access point acknowledgment message via the wireless transceiver to the plurality of mobile devices, wherein each mobile device of the plurality of mobile devices is configured for momentarily activating their haptic feedback device upon receiving the increment ball count access point acknowledgment message; and configuring the scoreboard controller, via the scoreboard controller interface, for incrementing a ball count on the scoreboard controller upon receiving the start between-inning clock device message.

In some embodiments, the processor may be further configured for receiving an increment strike count device message via the wireless transceiver from each mobile device of the plurality of mobile devices; upon receiving the increment strike count device message from any one of the plurality of mobile devices, transmitting an increment strike count access point acknowledgment message via the wireless transceiver to the plurality of mobile devices, wherein each mobile device of the plurality of mobile devices is configured for momentarily activating their haptic feedback device upon receiving the increment strike count access point acknowledgment message; and configuring the scoreboard controller, via the scoreboard controller interface, for incrementing a strike count on the scoreboard controller upon receiving the start between-inning clock device message.

In some embodiments, the processor may be further configured for receiving a batter-must-be-in-box scoreboard message from the scoreboard controller interface; and upon receiving the batter-must-be-in-box scoreboard message, transmitting a batter-must-be-in-box access point message via the wireless transceiver to the plurality of mobile devices. Additionally, each mobile device of the plurality of mobile devices may be configured for momentarily activating their haptic feedback device upon receiving the batter-must-be-in-box access point message. In further embodiments, the batter-must-be-in-box scoreboard message may be transmitted from the scoreboard controller based on a first time interval after receiving a start pitch clock access point message. In still further embodiments, the first time interval may be approximately ten seconds.

In some embodiments, the processor may be further configured for receiving a pitch clock expiration scoreboard message from the scoreboard controller interface; and upon receiving the pitch clock expiration scoreboard message, transmitting a pitch clock expiration access point message via the wireless transceiver to the plurality of mobile devices, wherein each mobile device of the plurality of mobile devices is configured for momentarily activating their haptic feedback device upon receiving the pitch clock expiration access point message. In further embodiments, the pitch clock expiration scoreboard message may be transmitted from the scoreboard controller based on a second time interval after receiving the start pitch clock access point message. In still further embodiments, the second time interval may be approximately twenty seconds.

In some embodiments, the processor may be further configured for receiving a between-inning warning scoreboard message from the scoreboard controller interface; and upon receiving the between-inning warning scoreboard message, transmitting a between-inning warning access point message via the wireless transceiver to the plurality of mobile devices. Additionally, each mobile device of the plurality of mobile devices may be configured for momentarily activating their haptic feedback device upon receiving the between-inning warning access point message. In further embodiments, the between-inning warning scoreboard message may be transmitted from the scoreboard controller based on a third time interval after receiving a between-inning clock access point message. In still further embodiments, the third time interval may be approximately ninety seconds.

In some embodiments, the processor may be further configured for receiving a between-inning expiration scoreboard message from the scoreboard controller interface; and upon receiving the between-inning expiration scoreboard message, transmitting a between-inning expiration access point message via the wireless transceiver to the plurality of mobile devices. Additionally, each mobile device of the plurality of mobile devices may be configured for momentarily activating their haptic feedback device upon receiving the between-inning expiration access point message. In further embodiments, the between-inning expiration scoreboard message may be transmitted from the scoreboard controller based on a fourth time interval after receiving the between-inning clock access point message. In still further embodiments, the fourth time interval may be approximately one hundred twenty seconds.

In some embodiments, the processor may be further configured for receiving a start between-batter clock device message via the wireless transceiver from each mobile device of the plurality of mobile devices; and upon receiving the start between-batter clock device message from any one of the plurality of mobile devices, transmitting a start between-batter clock access point acknowledgment message via the wireless transceiver to the plurality of mobile devices. Each mobile device of the plurality of mobile devices may be configured for momentarily activating their haptic feedback device upon receiving the start between-batter clock access point acknowledgment message. Additionally, the processor may be further configured for starting an external between-batter clock timer on the scoreboard controller via the scoreboard controller interface upon receiving the start between-batter clock device message; and/or starting an internal between-batter clock timer within the access point upon receiving the start between-inning clock device message.

In some embodiments, the processor may be further configured for receiving a between-batter warning scoreboard message from the scoreboard controller interface; and upon receiving the between-batter warning scoreboard message, transmitting a between-batter warning access point message via the wireless transceiver to the plurality of mobile devices. Each mobile device of the plurality of mobile devices may be configured for momentarily activating their haptic feedback device upon receiving the between-batter warning access point message. The between-batter warning scoreboard message may be transmitted from the scoreboard controller based on a fifth time interval after receiving a between-batter clock access point message. In certain embodiments, the fifth time interval may be approximately twenty-two seconds.

In some embodiments, the processor may be further configured for receiving a between-batter expiration scoreboard message from the scoreboard controller interface; and upon receiving the between-batter expiration scoreboard message, transmitting a between-batter expiration access point message via the wireless transceiver to the plurality of mobile devices. Each mobile device of the plurality of mobile devices may be configured for momentarily activating their haptic feedback device upon receiving the between-batter expiration access point message. The between-inning expiration scoreboard message may be transmitted from the scoreboard controller based on a sixth time interval after receiving the between-batter clock access point message. In certain embodiments, the sixth time interval may be approximately thirty seconds.

In some embodiments, the user interface may include a GUI. In further embodiments, the GUI may include a touch pad display.

In some embodiments, the wireless transceiver may be a wide-band direct sequence spread spectrum (WBDSSS) wireless transceiver. In further embodiments, the WBDSSS wireless transceiver may be configured to transmit and receive signals within a 902 megahertz (MHz) to 928 MHz frequency band.

In certain embodiments, the scoreboard controller interface may include an XLR connector, a DIN connector, an RJ11 connector, an RJ45 connector, or the like.

In another embodiment, a method implemented on an access point for facilitating a plurality of umpires of a baseball game is disclosed. The access point includes a processor, a memory electrically coupled with the processor, a user interface electrically coupled with the processor, a scoreboard controller interface electrically coupled with the processor, and a wireless transceiver electrically coupled with the processor. The wireless transceiver is configured for transmitting and receiving signals from a plurality of mobile devices operated by the plurality of umpires. The processor is configured for (1) receiving a start pitch clock device message via the wireless transceiver from each mobile device of the plurality of mobile devices; and (2) upon receiving the start pitch clock device message, transmitting a start pitch clock access point acknowledgment message via the wireless transceiver to the plurality of mobile devices, and each mobile device of the plurality of mobile devices is configured for momentarily activating a haptic feedback device upon receiving the start pitch clock access point acknowledgment message.

In some embodiments, the method may further include starting an external pitch clock timer on the scoreboard controller via the scoreboard controller interface upon receiving the start pitch clock device message.

In some embodiments, the method may further include starting an internal pitch clock timer within the access point upon receiving the start pitch clock device message.

In another embodiment, a non-transitory computer-readable storage medium is disclosed. The non-transitory computer-readable medium stores instructions to be implemented on an access point for facilitating a plurality of umpires of a baseball game. The instructions when executed by a processor cause the access point to perform a method. The access point includes a processor, a memory electrically coupled with the processor, a user interface electrically coupled with the processor, a scoreboard controller interface electrically coupled with the processor, and a wireless transceiver electrically coupled with the processor. The wireless transceiver is configured for transmitting and receiving signals from a plurality of mobile devices operated by the plurality of umpires. The processor is configured for (1) receiving a start pitch clock device message via the wireless transceiver from each mobile device of the plurality of mobile devices; and (2) upon receiving the start pitch clock device message, transmitting a start pitch clock access point acknowledgment message via the wireless transceiver to the plurality of mobile devices, and each mobile device of the plurality of mobile devices is configured for momentarily activating a haptic feedback device upon receiving the start pitch clock access point acknowledgment message.

In some embodiments, the method may further include starting an external pitch clock timer on the scoreboard controller via the scoreboard controller interface upon receiving the start pitch clock device message.

In some embodiments, the method may further include starting an internal pitch clock timer within the access point upon receiving the start pitch clock device message.

According to another embodiment, a mobile device is disclosed for facilitating an umpire of a baseball game. The mobile device includes a processor, a memory electrically coupled with the processor, a user interface electrically coupled with the processor, a haptic feedback device electrically coupled with the processor, and a wireless transceiver electrically coupled with the processor. The processor is configured for (1) receiving a start first timer selection via the user interface; (2) upon receiving the start first timer selection via the user interface, transmitting a start first timer device message via the wireless transceiver to an access point; (3) receiving a first timer access point acknowledgment message from the access point; and (4) upon receiving the start first timer access point acknowledgment message, momentarily activating the haptic feedback device (e.g., using a unique start first timer vibration pattern). The access point is electrically coupled with a scoreboard controller. Additionally, the access point is configured for starting an external first timer on the scoreboard controller upon receiving the start first timer device message and/or starting an internal first timer within the access point upon receiving the start first timer device message.

In some embodiments, the first timer may be associated with a first timer expiration time interval. In further embodiments, the first timer expiration time interval may be field programmable. In certain embodiments, the first timer expiration time interval may be associated with a league pitch clock time requirement. In some embodiments, the first timer expiration time interval may be preset to approximately twenty seconds.

In some embodiments, upon receiving the start first timer device message the access point may be further configured for resetting the external first timer on the scoreboard controller prior to starting the external first timer and/or resetting the internal first timer within the access point prior to starting the internal first timer.

In some embodiments, the user interface may include a first timer momentary switch and the start first timer selection may be received from the first timer momentary switch. In further embodiments, the first timer momentary switch may be positioned on a bottom side of the mobile device.

In some embodiments, the user interface may also include a graphical user interface (GUI). The GUI may be a display or touchpad display. The GUI may be configured to display a current status of the first timer. Additionally, the first timer may be a first count-down timer or a first count-up timer.

In some embodiments, the processor may be further configured for receiving a first timer expiration warning message from the access point; and momentarily activating the haptic feedback device (e.g., using a unique first timer warning vibration pattern) upon receiving the first timer warning message. Additionally, the first timer warning message may be transmitted from the access point based on a first timer warning time interval. In further embodiments, the first timer warning time interval is field programmable. In certain embodiments, the first timer warning time interval may be associated with a league pitch clock warning time requirement. In some embodiments, the first timer warning time interval may be preset to approximately eight seconds.

In some embodiments, the processor may be further configured for receiving a first timer expired message from the access point; and momentarily activating the haptic feedback device (e.g., using a unique first timer expired pattern) upon receiving the first timer expired message. Additionally, the first timer expired message may be transmitted from the access point based on the first timer expiration time interval being reached by the first timer.

In some embodiments, the processor may be configured for (1) receiving a start second timer selection via the user interface; (2) upon receiving the start second timer selection via the user interface, transmitting a start second timer device message via the wireless transceiver to the access point; (3) receiving a second timer access point acknowledgment message from the access point; and (4) upon receiving the start second timer access point acknowledgment message, momentarily activating the haptic feedback device (e.g., using a unique start second timer vibration pattern). Additionally, the access point may be configured for starting an external second timer on the scoreboard controller upon receiving the start second timer device message and/or starting an internal second timer within the access point upon receiving the start second timer device message.

In some embodiments, the second timer may be associated with a second timer expiration time interval. In further embodiments, the second timer expiration time interval may be field programmable. In certain embodiments, the second timer expiration time interval may be associated with a league between inning clock time requirement. In some embodiments, the second timer expiration time interval may be preset to approximately one hundred twenty seconds.

In some embodiments, upon receiving the start second timer device message the access point may be further configured for resetting the external second timer on the scoreboard controller prior to starting the external second timer and/or resetting the internal second timer within the access point prior to starting the internal second timer.

In some embodiments, the user interface may include a second timer momentary switch and the start second timer selection may be received from the second timer momentary switch. In further embodiments, the second timer momentary switch may be positioned on a left side of the mobile device.

In some embodiments, the GUI may be configured to display a current status of the second timer. Additionally, the second timer may be a second count-down timer or a second count-up timer.

In some embodiments, the processor may be further configured for receiving a second timer expiration warning message from the access point; and momentarily activating the haptic feedback device (e.g., using a unique second timer warning vibration pattern) upon receiving the second timer warning message. Additionally, the second timer warning message may be transmitted from the access point based on a second timer warning time interval. In further embodiments, the second timer warning time interval is field programmable. In certain embodiments, the second timer warning time interval may be associated with a league between inning clock warning time requirement. In some embodiments, the second timer warning time interval may be preset to approximately thirty seconds.

In some embodiments, the processor may be further configured for receiving a second timer expired message from the access point; and momentarily activating the haptic feedback device (e.g., using a unique second timer expired pattern) upon receiving the second timer expired message. Additionally, the second timer expired message may be transmitted from the access point based on the second timer expiration time interval being reached by the second timer.

In some embodiments, the processor may be configured for (1) receiving a start third timer selection via the user interface; (2) upon receiving the start third timer selection via the user interface, transmitting a start third timer device message via the wireless transceiver to the access point; (3) receiving a third timer access point acknowledgment message from the access point; and (4) upon receiving the start third timer access point acknowledgment message, momentarily activating the haptic feedback device (e.g., using a unique start third timer vibration pattern). Additionally, the access point may be configured for starting an external third timer on the scoreboard controller upon receiving the start third timer device message and/or starting an internal third timer within the access point upon receiving the start third timer device message.

In some embodiments, the third timer may be associated with a third timer expiration time interval. In further embodiments, the third timer expiration time interval may be field programmable. In certain embodiments, the third timer expiration time interval may be associated with certain league action clock time requirements. The certain league action clock time requirements may include pace-of-play between batters, mound visits, offensive timeouts, and/or the like. In some embodiments, the third timer expiration time interval may be preset to approximately thirty seconds.

In some embodiments, upon receiving the start third timer device message the access point may be further configured for resetting the external third timer on the scoreboard controller prior to starting the external third timer and/or resetting the internal third timer within the access point prior to starting the internal third timer.

In some embodiments, the user interface may include a third timer momentary switch and the start third timer selection may be received from the third timer momentary switch. In further embodiments, the third timer momentary switch may be positioned on a left side of the mobile device.

In some embodiments, the GUI may be configured to display a current status of the third timer. Additionally, the third timer may be a third count-down timer or a third count-up timer.

In some embodiments, the processor may be further configured for receiving a third timer expiration warning message from the access point; and momentarily activating the haptic feedback device (e.g., using a unique third timer warning vibration pattern) upon receiving the third timer warning message. Additionally, the third timer warning message may be transmitted from the access point based on a third timer warning time interval. In further embodiments, the third timer warning time interval is field programmable. In certain embodiments, the third timer warning time interval may be associated with a league certain actions (as previously described) clock warning time requirements. In some embodiments, the third timer warning time interval may be preset to approximately eight seconds.

In some embodiments, the processor may be further configured for receiving a third timer expired message from the access point; and momentarily activating the haptic feedback device (e.g., using a unique third timer expired pattern) upon receiving the third timer expired message. Additionally, the third timer expired message may be transmitted from the access point based on the third timer expiration time interval being reached by the third timer.

In some embodiments, the processor may be configured for (1) receiving a start fourth timer selection via the user interface; (2) upon receiving the start fourth timer selection via the user interface, transmitting a start fourth timer device message via the wireless transceiver to the access point; (3) receiving a fourth timer access point acknowledgment message from the access point; and (4) upon receiving the start fourth timer access point acknowledgment message, momentarily activating the haptic feedback device (e.g., using a unique start unique timer vibration pattern). Additionally, the access point may be configured for starting an external fourth timer on the scoreboard controller upon receiving the start fourth timer device message and/or starting an internal fourth timer within the access point upon receiving the start fourth timer device message.

In some embodiments, the fourth timer may be associated with a fourth timer expiration time interval. In further embodiments, the fourth timer expiration time interval may be field programmable. In certain embodiments, the fourth timer expiration time interval may be associated with a league pitching change clock time requirement. In some embodiments, the fourth timer expiration time interval may be preset to approximately one hundred fifty seconds.

In some embodiments, upon receiving the start fourth timer device message the access point may be further configured for resetting the external fourth timer on the scoreboard controller prior to starting the external fourth timer and/or resetting the internal fourth timer within the access point prior to starting the internal fourth timer.

In some embodiments, the user interface may include a fourth timer momentary switch and the start fourth timer selection may be received from the fourth timer momentary switch. In further embodiments, the fourth timer momentary switch may be positioned on a left side of the mobile device.

In some embodiments, the GUI may be configured to display a current status of the fourth timer. Additionally, the fourth timer may be a fourth count-down timer or a fourth count-up timer.

In some embodiments, the processor may be further configured for receiving a fourth timer expiration warning message from the access point; and momentarily activating the haptic feedback device (e.g., using a unique fourth timer warning vibration pattern) upon receiving the fourth timer warning message. Additionally, the fourth timer warning message may be transmitted from the access point based on a fourth timer warning time interval. In further embodiments, the fourth timer warning time interval is field programmable. In certain embodiments, the fourth timer warning time interval may be associated with a league pitching change clock warning time requirement. In some embodiments, the fourth timer warning time interval may be preset to approximately thirty seconds.

In some embodiments, the processor may be further configured for receiving a fourth timer expired message from the access point; and momentarily activating the haptic feedback device (e.g., using a unique fourth timer expired pattern) upon receiving the fourth timer expired message. Additionally, the fourth timer expired message may be transmitted from the access point based on the fourth timer expiration time interval being reached by the fourth timer.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

FIG. 9 depicts a flowchart illustrating a method implemented on the mobile device of FIG. 8 in accordance with embodiments of the present disclosure . . .

DETAILED DESCRIPTION

Figure 1:
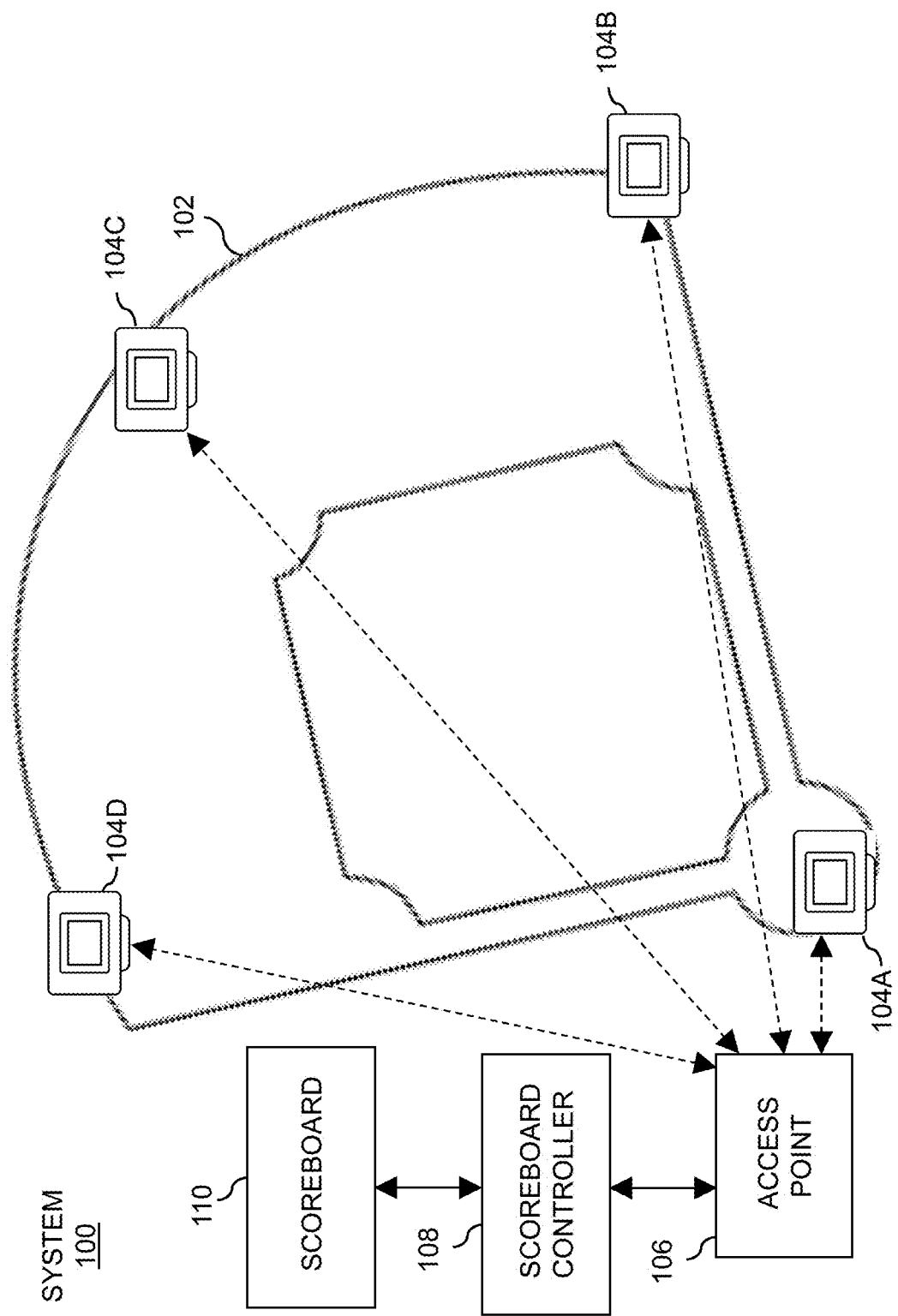
FIG. 1 depicts a diagram illustrating a system for facilitating a plurality of umpires during a baseball game in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Game officials for baseball include the umpire-in-chief (i.e., plate umpire) and one or more field umpires (i.e., base umpires). A field umpire may take any position desired and shall aid the umpire-in-chief in administering the rules. Disclosed herein are methods, devices, and systems for facilitating umpires officiating a baseball game. Baseball has recently introduced a pitch clock for minor league and collegiate games. More specifically, the disclosed methods devices, and systems give the umpires the ability to start, stop, and reset three different clocks (including a pitch clock) that are visible on the scoreboard and on their individual belt packs (i.e., mobile devices).

A first clock is a twenty second pitch clock that vibrates after ten seconds alerting the umpire-in-chief that the batter is not in the box. Under that scenario, an automatic strike will be called by rule. Once twenty seconds have expired, a final vibration alerts the umpire-in-chief that the pitcher must have started their wind-up. If the pitcher has not started their wind-up, an automatic ball will be called by rule. The first clock interval and early warning may be adjusted to any given league requirement.

A second clock is a two minute between inning clock that vibrates at a ninety second mark to alert at least one umpires to inform the pitcher for one last warmup pitch. A final vibration at one hundred twenty seconds alerts the umpires to begin the inning. The second clock interval and early warning may be adjusted to any given league requirement.

A third clock is a thirty second between-batters clock that vibrates at a twenty-two second mark to provide an early warning of expiration. A final vibration at thirty seconds alerts the umpires to the expiration. The third clock interval and early warning may be adjusted to any given league requirement.

FIG. 1 depicts a diagram illustrating a system 100 for facilitating a plurality of umpires during a baseball game in accordance with embodiments of the present disclosure. A baseball diamond 102 is depicted with mobile devices 104A-104D (e.g., belt packs) that may be carried on the waist bands or belts of four umpires (not shown in FIG. 1). The mobile devices 104A-104D communicate over radio frequency (RF) wireless links with an access point 106. The access point 106 is electrically coupled with a scoreboard control console 108. A scoreboard 110 is either electrically coupled or wirelessly coupled with the scoreboard control console 108. The scoreboard control console 108 may be an OES control console, a Daktronics control console, or the like.

The access point 106 utilizes a DIN connector with unique cables to interface with specific wiring and connector interfaces for different manufacturers' control consoles (e.g., an XLR for the OES control consoles and an RJ11 for the Daktronics control consoles). The input and output communications between the access point 106 and scoreboard control console 108 include isolated switched state (dry contact) signals. The access point 106 has an input port requiring remote dry contact control that can be programmatically defined to accommodate features supported by various scoreboard controllers (e.g., the scoreboard controller may output a state change when the clock reaches zero). The access point 106 supports the ability to program and map input and output connections for specific functions and wiring configurations.

The mobile devices 104A-104D can each detect umpire inputs on a user interface (UI), and immediately send a message to the access point 106. The access point 106 receives the message, decodes the message, and activates one or more remote inputs of the scoreboard control console 108 to either start or stop the clocks. The access point 106 also sends the mobile devices 104A-104C an acknowledgement that the message was successfully received. The mobile devices 104A-104D use the acknowledgement to drive a haptic vibration motor (i.e., haptic feedback device) alerting the umpires of a status change. The entire transaction typically takes place in less than 50 milliseconds (mS). This response time is faster and more consistent than a human's reaction at the scoreboard control console 108 watching for umpire signals.

The RF wireless links operate over a 902 mega-Hertz (MHz) to 928 MHz frequency band, which is outside the more used Bluetooth® and Wi-Fi frequency bands. The 902 MHZ to 928 MHz frequency band provides excellent range and propagation characteristics as compared to the Bluetooth® and Wi-Fi frequency bands. The RF wireless links specifically use Wide-band Direct Sequence Spread Spectrum (WBDSSS) technology to minimize interference on a given link channel. Data for each RF wireless link of the mobile devices 104A-104C is spread across five channels each having a 200 kilohertz (kHz) spacing (i.e., providing a 1 MHz wide effective channel). There are a total of 123 available channels with center frequencies of each 1 MHz effective channel on channels 3, 8, 13, . . . 123 (i.e., 902.8 MHz, 903.8 MHz, 904.8 MHZ, . . . 926.8 MHZ). The RF wireless links are each wide-band half-duplex spread spectrum. In some embodiments, frequency hopping may be employed for the RF wireless links.

The access point 106 may also sample a local RF spectrum at the baseball diamond 102 and surrounding area for interference, and dynamically select the best channels for device commissioning and operation of the mobile devices 104A-104D. In some embodiments, RF mitigation steps such as separating the proximity of the mobile devices 104A-104D and the access point 106 may be required.

The mobile devices 104A-104C and the access point 106 may each transmit up to a power level of +10 decibel-milliwatts (dBm) with a receiver sensitivity of −110 dBm yielding a received signal strength indicator (RSSI) dynamic range of 95 dB. This provides much overhead for blockage of any of the RF wireless signals due to the bodies of players, base coaches, and/or umpires. The mobile devices 104A-104D each include a helical printed circuit board (PCB) antenna. The access point 106 includes an external one half wave dipole antenna. Additionally, WBDSSS modulation enables Forward Error Correction (FEC) using K=4 as the constraint length in a convolutional encoder.

To minimize power consumption and prolong battery life, the mobile devices 104A-104D operate in a non-beacon mode and each generate a status/keep-alive message at a programmable interval. The status/keep-alive messages contain statistics associated with the mobile devices 104A-104C including their battery status. During network establishment, each of the mobile devices 104A-104C scan for incoming messages from the access point 106 at approximately 500 mS intervals to service key regeneration commands, over the air download commands, and remote configuration or control commands. This scan interval is also configurable.

Each of the mobile devices 104A-104D has a unique identifier (ID) in the form of a six-byte media access control (MAC) address and a configurable four-byte serial number. Up to fifty mobile devices may be supported by the access point 106. However, the access point 106 may be typically configured to handle only two to five mobile devices per network session (i.e., required umpires for baseball game) as a default.

The network is compliant to the Institute of Electrical and Electronics Engineers (IEEE) 802.15.4 standard defining the MAC layer protocol.

Advanced Encryption Standard (AES) 128 encryption/decryption is used for the data at the MAC layer. The mobile devices 104A-104D and the access point 106 use secure commissioning with shared secret network keys for initial pairing (AES-CMAC). Unique dynamic device keys are generated using Elliptic Curve Diffie Hellman (ECDH) p256 during commissioning for run-time data exchange. The access point 106 communicates only with mobile devices with the shared secret key, and only accepts data that is encrypted with the dynamic device keys. The access point 106 controls both the generation and the storage of the dynamic device keys. Additional security is provided by limiting the number of associated mobile devices active during the network session (e.g., five devices-mobile devices 104A-104D and one spare mobile device). This number is also configurable.

All communications between the mobile devices 104A-104D and the access point 106 are acknowledged by a return message/packet. The system 100 is further configured to detect umpire input and alert the scoreboard control console 108 in less than 50 mS. The mobile devices 104A-104D are also configured to alert each other via the access point 106 and initiating via haptic feedback in less than 250 mS.

The access point 106 logs and stores data of the mobile devices 104A-104D including timestamps, device IDs, events, and event data. For example, the event data may include when a scoreboard reaches 0:00:00 and/or game clock, inning, time-outs, etc. Real time and stored data are available for Internet export. The access point 106 may be connected to the Internet via a Wi-Fi and/or Ethernet connection. Data may also be stored in the cloud in addition to a removable Secure Digital (SD) card.

Configuration data of the mobile devices 104A-104D is available via a remote application program interface (API) while connected with the access point 106. Additionally, software within the mobile devices 104A-104D may be updated by the remote API.

In a specific embodiment, the processor of each mobile device 104A-104D may be configured for:

receiving a start pitch clock selection via the user interface;

upon receiving the start pitch clock selection via the user interface, transmitting a start pitch clock device message via the wireless transceiver to the access point 106;

receiving a start pitch clock access point acknowledgment message from the access point 106;

upon receiving the start pitch clock access point acknowledgment message, momentarily activating the haptic feedback device;

upon receiving the start pitch clock device message the access point resetting the external pitch clock timer on the scoreboard controller prior to starting the external pitch clock timer and/or resetting the internal pitch clock timer within the access point prior to starting the internal pitch clock timer;

receiving a reset pitch clock selection via the user interface;

upon receiving the reset pitch clock selection via the user interface, transmitting a reset pitch clock device message via the wireless transceiver to the access point 106;

receiving a reset pitch clock access point acknowledgment message from the access point 106;

upon receiving the reset pitch clock access point acknowledgment message, momentarily activating the haptic feedback device;

receiving a start between-inning clock selection via the user interface;

upon receiving the start between-inning clock selection via the user interface, transmitting a start between-inning clock device message via the wireless transceiver to the access point 106;

receiving a start between-inning clock access point acknowledgment message from the access point 106;

upon receiving the start between-inning clock access point acknowledgment message, momentarily activating the haptic feedback device;

receiving an increment ball count selection via the user interface;

upon receiving the increment ball count selection via the user interface, transmitting an increment ball count device message via the wireless transceiver to the access point 106;

receiving an increment ball count access point acknowledgment message from the access point;

upon receiving the increment ball count access point acknowledgment message, momentarily activating the haptic feedback device;

receiving an increment strike count selection via the user interface;
upon receiving the increment strike count selection via the user interface, transmitting an increment strike device message via the wireless transceiver to the access point 106;
receiving an increment strike count access point acknowledgment message from the access point 106;
receiving the increment strike count access point acknowledgment message;
momentarily activating the haptic feedback device, upon receiving the increment strike count access point acknowledgment message;
receiving a batter-must-be-in-box message from the access point;
and momentarily activating the haptic feedback device upon receiving the batter-must-be-in-box message;
receiving a pitch clock expiration message from the access point 106;
momentarily activating the haptic feedback device upon receiving the pitch clock expiration message;
receiving a between-inning warning message from the access point 106;
momentarily activating the haptic feedback device upon receiving the between-inning warning message;
receiving a between-inning expiration message from the access point;
momentarily activating the haptic feedback device upon receiving the between-inning expiration message;
receiving the start pitch clock selection via a the pitch-clock-momentary switch;
receiving the start pitch clock selection via either a no-runners-on-base-pitch-clock-momentary switch or a runners-on-base-pitch-clock momentary switch;
receiving the start between-inning clock selection via a between-inning clock momentary switch;
receiving a start between-batter clock selection via the user interface and transmitting a start between-batter clock device message via the wireless transceiver to the access point upon receiving the start between-batter clock selection;
receiving a start between-batter clock access point acknowledgment message from the access point and upon receiving the start between-batter clock access point acknowledgment message, momentarily activating the haptic feedback device;
receiving a between-batter warning message from the access point and momentarily activating the haptic feedback device upon receiving the between-inning warning message;
receiving the start between-batter clock selection via a between-batter clock momentary switch; and
receiving a between-batter expiration message from the access point and momentarily activating the haptic feedback device upon receiving the between-batter expiration message.

Additionally in this specific embodiment, the processor of the access point 106 may be configured for:
receiving a start pitch clock device message via the wireless transceiver from each mobile device of the plurality of mobile devices 104A-104D;
upon receiving the start pitch clock device message from any one of the plurality of mobile devices 104A-104D, transmitting a start pitch clock access point acknowledgment message via the wireless transceiver to the plurality of mobile devices 104A-104D;
upon receiving the start pitch clock device message, starting an external pitch clock timer on the scoreboard controller via the scoreboard controller interface upon receiving the start pitch clock device message, and/or starting an internal pitch clock timer within the access point;
resetting the external pitch clock timer on the scoreboard controller prior to starting the external pitch clock timer and/or resetting the internal pitch clock timer within the access point prior to starting the internal pitch clock timer.
receiving a reset pitch clock device message via the wireless transceiver from each mobile device of the plurality of mobile devices 104A-104D;
upon receiving the reset pitch clock device message from any one of the plurality of mobile devices, transmitting a reset pitch clock access point acknowledgment message via the wireless transceiver to the plurality of mobile devices 104A-104D;
resetting the external pitch clock timer on the scoreboard controller via the scoreboard controller interface upon receiving the reset pitch clock device message and/or resetting the internal pitch clock timer within the access point upon receiving the reset pitch clock device message;
receiving a start between-inning clock device message via the wireless transceiver from each mobile device of the plurality of mobile devices 104A-104D;
upon receiving the start between-inning clock device message from any one of the plurality of mobile devices 104A-104D, transmitting a start between-inning clock access point acknowledgment message via the wireless transceiver to the plurality of mobile devices 104A-104D;
starting an external between-inning clock timer on the scoreboard controller via the scoreboard controller interface upon receiving the start between-inning clock device message and/or starting an internal between-inning clock timer within the access point upon receiving the start between-inning clock device message;
receiving an increment ball count device message via the wireless transceiver from each mobile device of the plurality of mobile devices 104A-104D;
upon receiving the increment ball count device message from any one of the plurality of mobile devices 104A-104D, transmitting an increment ball count access point acknowledgment message via the wireless transceiver to the plurality of mobile devices 104A-104D;
configuring the scoreboard controller, via the scoreboard controller interface, for incrementing a ball count on the scoreboard controller upon receiving the start between-inning clock device message;
receiving an increment strike count device message via the wireless transceiver from each mobile device of the plurality of mobile devices 104A-104D;
upon receiving the increment strike count device message from any one of the plurality of mobile devices 104A-104D, transmitting an increment strike count access point acknowledgment message via the wireless transceiver to the plurality of mobile devices 104A-104D;
configuring the scoreboard controller, via the scoreboard controller interface, for incrementing a strike count on the scoreboard controller upon receiving the start between-inning clock device message;
receiving a batter-must-be-in-box scoreboard message from the scoreboard controller interface;

upon receiving the batter-must-be-in-box scoreboard message, transmitting a batter-must-be-in-box access point message via the wireless transceiver to the plurality of mobile devices 104A-104D;

receiving a pitch clock expiration scoreboard message from the scoreboard controller interface;

upon receiving the pitch clock expiration scoreboard message, transmitting a pitch clock expiration access point message via the wireless transceiver to the plurality of mobile devices 104A-104D;

receiving a between-inning warning scoreboard message from the scoreboard controller interface;

upon receiving the between-inning warning scoreboard message, transmitting a between-inning warning access point message via the wireless transceiver to the plurality of mobile devices 104A-104D;

receiving a between-inning expiration scoreboard message from the scoreboard controller interface;

upon receiving the between-inning expiration scoreboard message, transmitting a between-inning expiration access point message via the wireless transceiver to the plurality of mobile devices 104A-104D;

receiving a start between-batter clock device message via the wireless transceiver from each mobile device of the plurality of mobile devices; and upon receiving the start between-batter clock device message from any one of the plurality of mobile devices, transmitting a start between-batter clock access point acknowledgment message via the wireless transceiver to the plurality of mobile devices;

starting an external between-batter clock timer on the scoreboard controller via the scoreboard controller interface upon receiving the start between-batter clock device message; and/or starting an internal between-batter clock timer within the access point upon receiving the start between-inning clock device message;

receiving a between-batter warning scoreboard message from the scoreboard controller interface; and upon receiving the between-batter warning scoreboard message, transmitting a between-batter warning access point message via the wireless transceiver to the plurality of mobile devices;

receiving a between-batter expiration scoreboard message from the scoreboard controller interface; and upon receiving the between-batter expiration scoreboard message, transmitting a between-batter expiration access point message via the wireless transceiver to the plurality of mobile devices.

Figure 2:
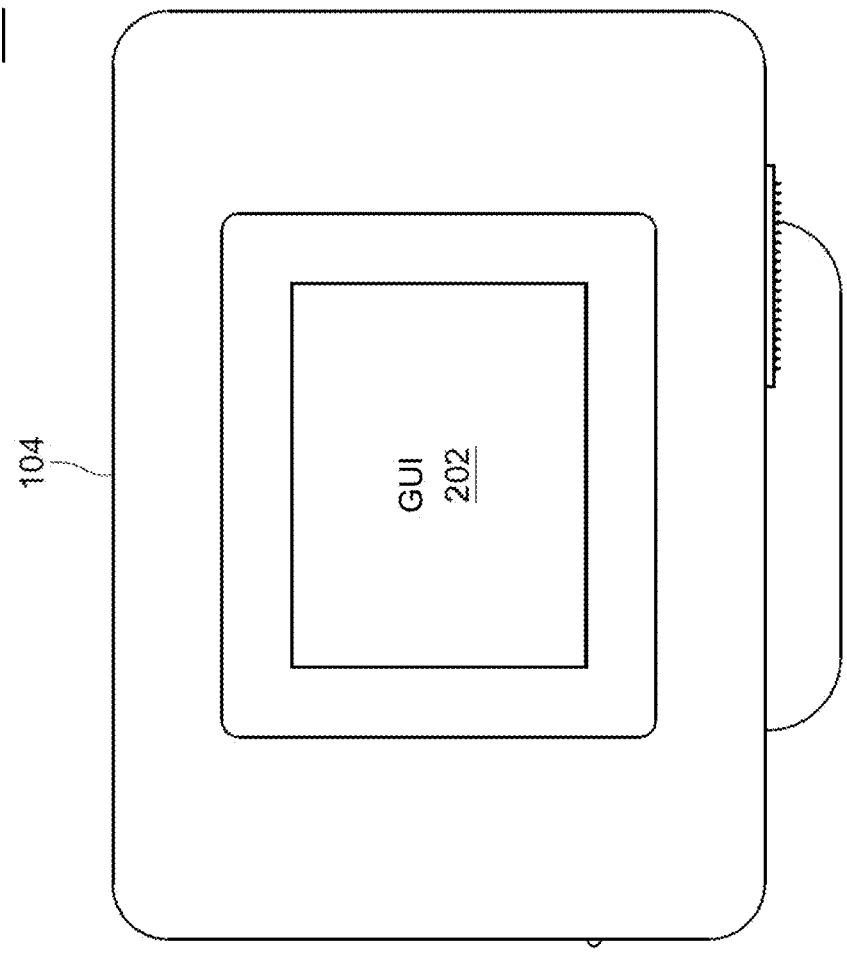
FIG. 2 depicts a diagram illustrating a side view and a front view of a mobile device of FIG. 1 in accordance with embodiments of the present disclosure.
Figure 2:
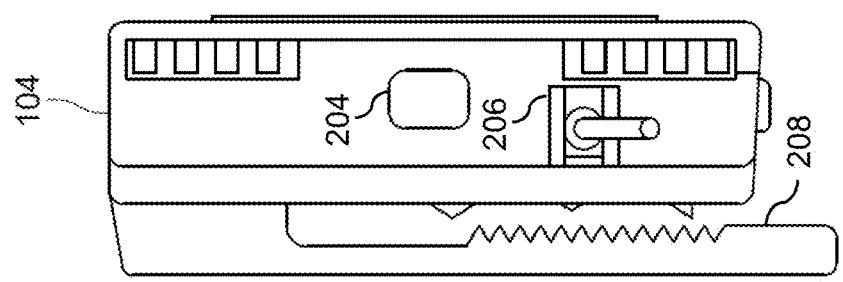

FIG. 2 depicts a diagram 200 illustrating a side view and a front view of a mobile device 104 of FIG. 1 in accordance with embodiments of the present disclosure. The mobile device 104 includes rechargeable lithium batteries and a universal serial bus (USB) charging port. In some embodiments, the mobile device 104 may include a wireless charging port. The mobile device 104 is lightweight and is configured to enter a sleep mode after approximately fifteen minutes of inactivity. The mobile device 104 is configured to save configuration data using onboard flash memory. Configuration data includes an access point ID, a network ID, frequency bands, frequency channels, serial number, and encryption/decryption keys.

The mobile device 104 also includes a graphical user interface (GUI) 202. Specifically, the GUI 202 may include a color thin-film transistor (TFT) display with light emitting diode (LED) backlight supporting custom graphics and touch screen. Tilt based operation further conserves battery light by dimming the GUI 202 when not being viewed by an umpire. Additionally, the mobile device 104 includes a momentary switch 204 and a toggle switch 206. The mobile device 104 may include additional momentary switches, toggle switches, and/or other types of switches on other sides of the mobile device 104 (not shown in FIG. 2). The mobile device 104 also includes a belt clip 208. Switches are positioned on the mobile device 104 in such a manner that an umpire can utilize the mobile device 104 while clipped to a belt. The GUI 202 may be used for additional features to facilitate the umpire. For example, an icon on the GUI 202 may launch a stopwatch application. The stopwatch application may use one or more of the switches on the sides of the mobile device 104 or GUI 202 for start, stop, lap, and reset features. The stopwatch application may use haptic feedback to indicate when and which switch was activated and/or a timer expired, such as a countdown feature of the stopwatch.

Figure 3:
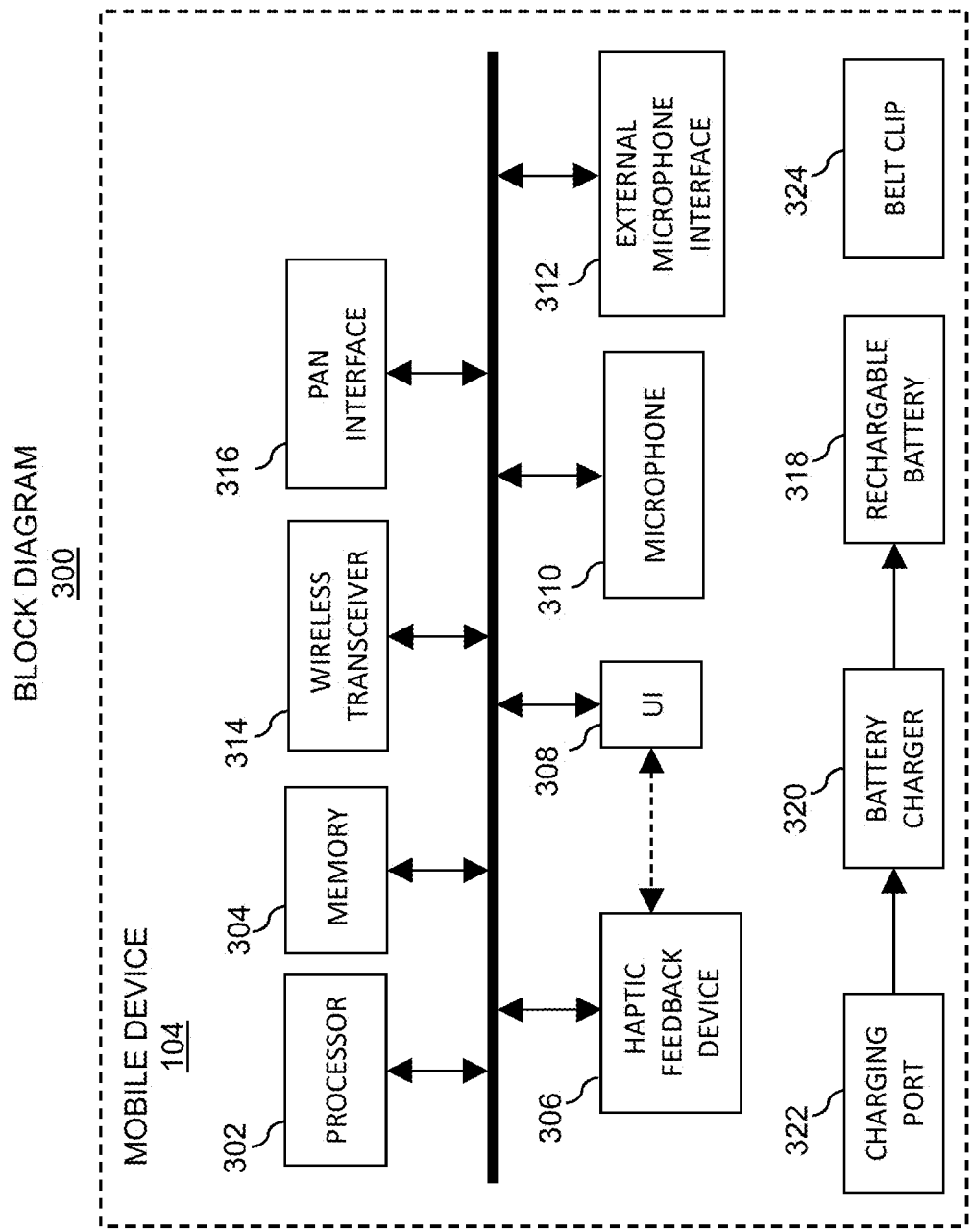
FIG. 3 depicts a block diagram of the mobile device of FIG. 1 and FIG. 2 in accordance with embodiments of the present disclosure.

FIG. 3 depicts a block diagram 300 of the mobile device 104 of FIGS. 1 and 2 in accordance with embodiments of the present disclosure. The mobile device 104 includes a processor 302, a memory 304, a haptic feedback device 306 and a user interface (UI) 308. In some embodiments, the memory 304 or a portion of the memory 304 may be integrated with the processor 1302. The memory 304 may include a combination of volatile memory and non-volatile memory. In some embodiments the processor 302 and the memory 304 may be embedded in a microcontroller. The UI 308 includes a touchpad display and a plurality of momentary switches positioned for easy access by an umpire without having direct eye contact with the mobile device 104 as disclosed in the description of FIG. 2. The haptic feedback device 306 may be mechanically coupled with a case of the mobile device 104 and/or the UI 308. The haptic feedback device 306 may be configured to provide a plurality of unique vibrations patterns to the umpire without having to be viewing the mobile device 104. The plurality of vibrations patterns may include a plurality of unique vibration frequencies and/or a plurality of unique vibration on-off sequences.

The mobile device 104 also includes a microphone 310 and an external microphone interface 312. The external microphone interface 312 may be configured to be coupled with a lavalier microphone. The mobile device 104 may be further configured to accept audio (e.g., speech) from an umpire and relay to a public address (PA) system (not shown in FIG. 1)

The mobile device 104 further includes a wireless transceiver 314 and a PAN interface 316. The wireless transceiver 314 may be configured to transmit and receive WBDSSS compliant signals. The WBDSSS signals may be associated with a 902 MHz to 928 MHz frequency band.

The PAN interface 316 may be compliant to at least one version of a Bluetooth® standard. The PAN interface 316 may also be configured to wirelessly couple to an external microphone (e.g., a Bluetooth microphone).

The mobile device 104 derives power from a rechargeable battery 318. A battery charger 320 is configured to receive external power from a charging port 322. The charging port 322 may be configured to be coupled to a USB charger. The wireless charging port 322 may also be a wireless charging port. A belt clip 324 is included for attaching the mobile device 104 to a game official (e.g., umpire).

The microphone 302 easily adapts to standard lanyards and is tuned to the internal detection circuits of the mobile device 104. Larger cabling and flexible insulation resists wire breakage while electrically coupling the microphone 302 to the mobile device 104. In some embodiments, a wireless microphone (not shown in FIG. 3) may be used.

The mobile device 104 also includes haptic feedback technology for responding to acknowledgement packets/messages received from the access point 106. Patterns and intensity of haptic feedback are under software.

Figure 4:
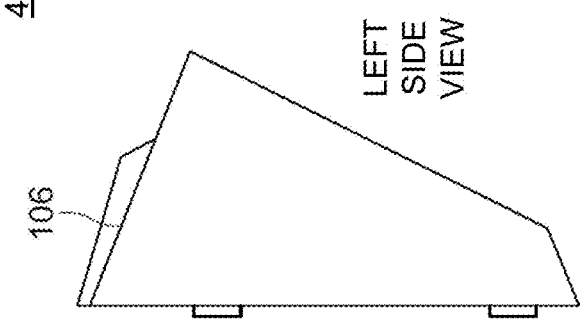
FIG. 4 depicts a diagram illustrating a top view, a front view, a right side view, and a left side view of an access point of FIG. 1 in accordance with embodiments of the present disclosure.
Figure 4:
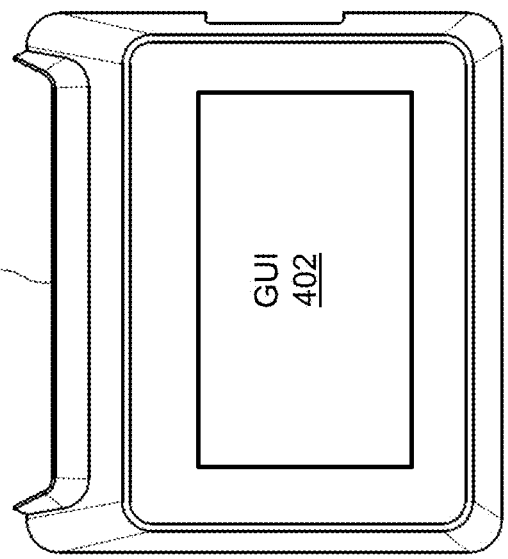
Figure 4:
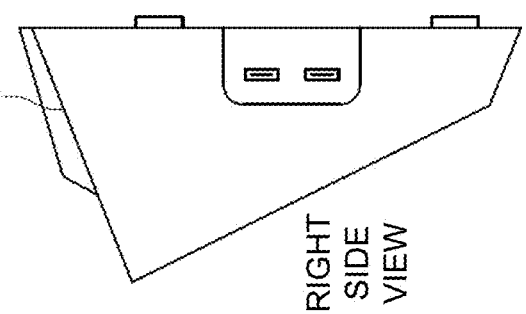

FIG. 4 depicts a diagram 400 illustrating a front view, a top view, a right side view and a left side view of the access point 106 of FIG. 1 in accordance with embodiments of the present disclosure. Diagram 400 also illustrates a GUI 402 of the access point 106.

Figure 5:
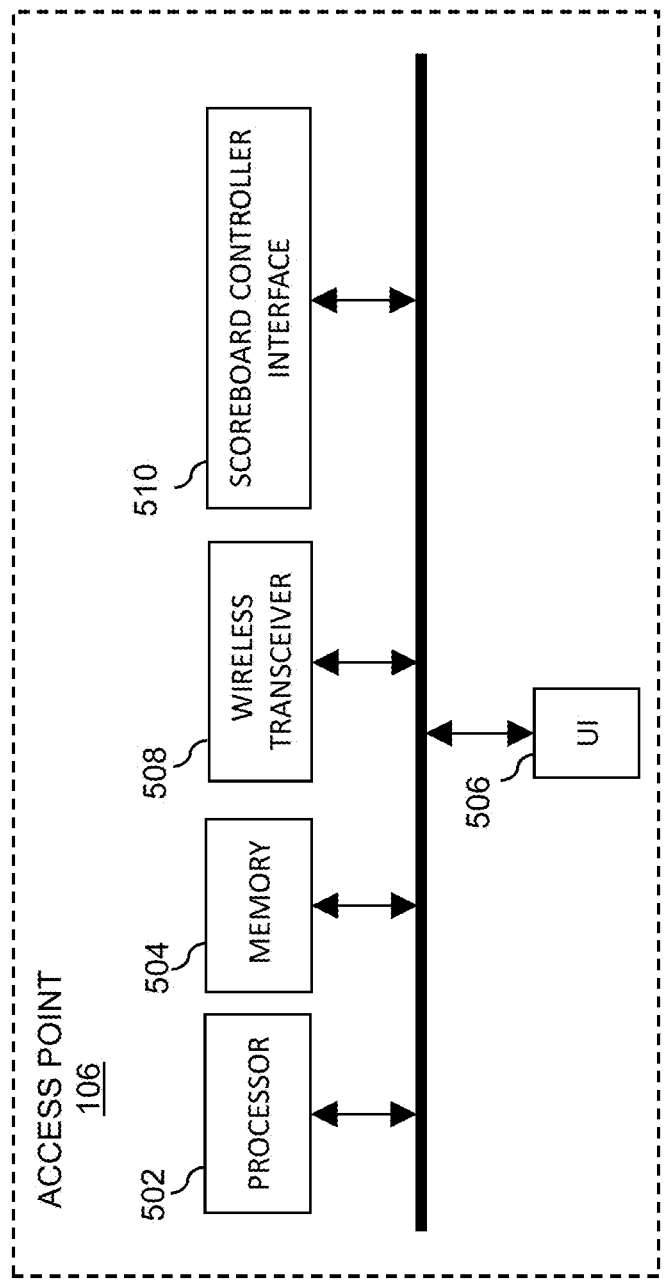
FIG. 5 depicts a block diagram illustrating the access point of FIG. 1 and FIG. 4 in accordance with embodiments of the present disclosure.

FIG. 5 depicts a block diagram 500 illustrating the access point 106 of FIG. 1 and FIG. 4 in accordance with embodiments of the present disclosure. The access point 106 includes a processor 502, a memory 504, a user interface (UI) 506, a wireless transceiver 508, and a scoreboard controller interface 510. The UI includes the GUI 402 of FIG. 4 and may include additional switches, such as momentary switches. The UI 506 may be used by a scoreboard operator to implement any of the UI functions of the mobile device 104. The UI 506 may also be used for the initial pairing of the plurality the mobile devices 104A-104D with the access point 106. The wireless transceiver 508 may be configured to transmit and receive WBDSSS compliant signals. The WBDSSS signals may be associated with a 902 MHz to 928 MHz frequency band.

Figure 6:
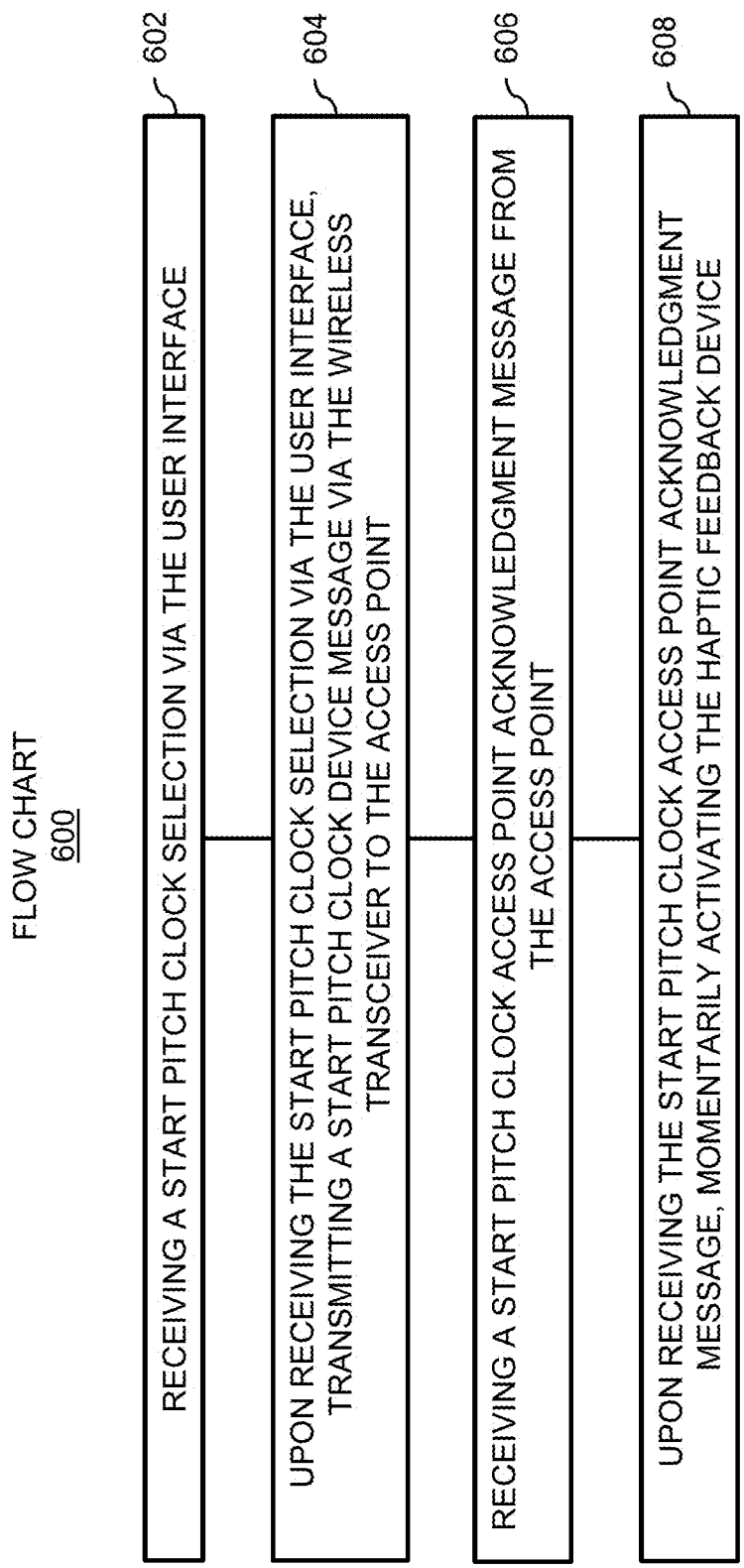
FIG. 6 depicts a flowchart illustrating a method implemented on the mobile device of FIG. 1, FIG. 2, and FIG. 3 in accordance with embodiments of the present disclosure.

In broader embodiments, FIG. 6 depicts a flowchart 600 illustrating a method implemented on the mobile device 104 of FIG. 1, FIG. 2, and FIG. 3 in accordance with embodiments of the present disclosure. In step 602, the method includes receiving a start pitch clock selection via the user interface 308. In step 604, the method further includes upon receiving the start pitch clock selection via the user interface 308, transmitting a start pitch clock device message via the wireless transceiver 314 to the access point 106. In step 606, the method further includes receiving a start pitch clock access point acknowledgment message from the access point 106 via wireless transceiver 314. In step 608, upon receiving the start pitch clock access point acknowledgment message, momentarily activating the haptic feedback device 306.

Figure 7:
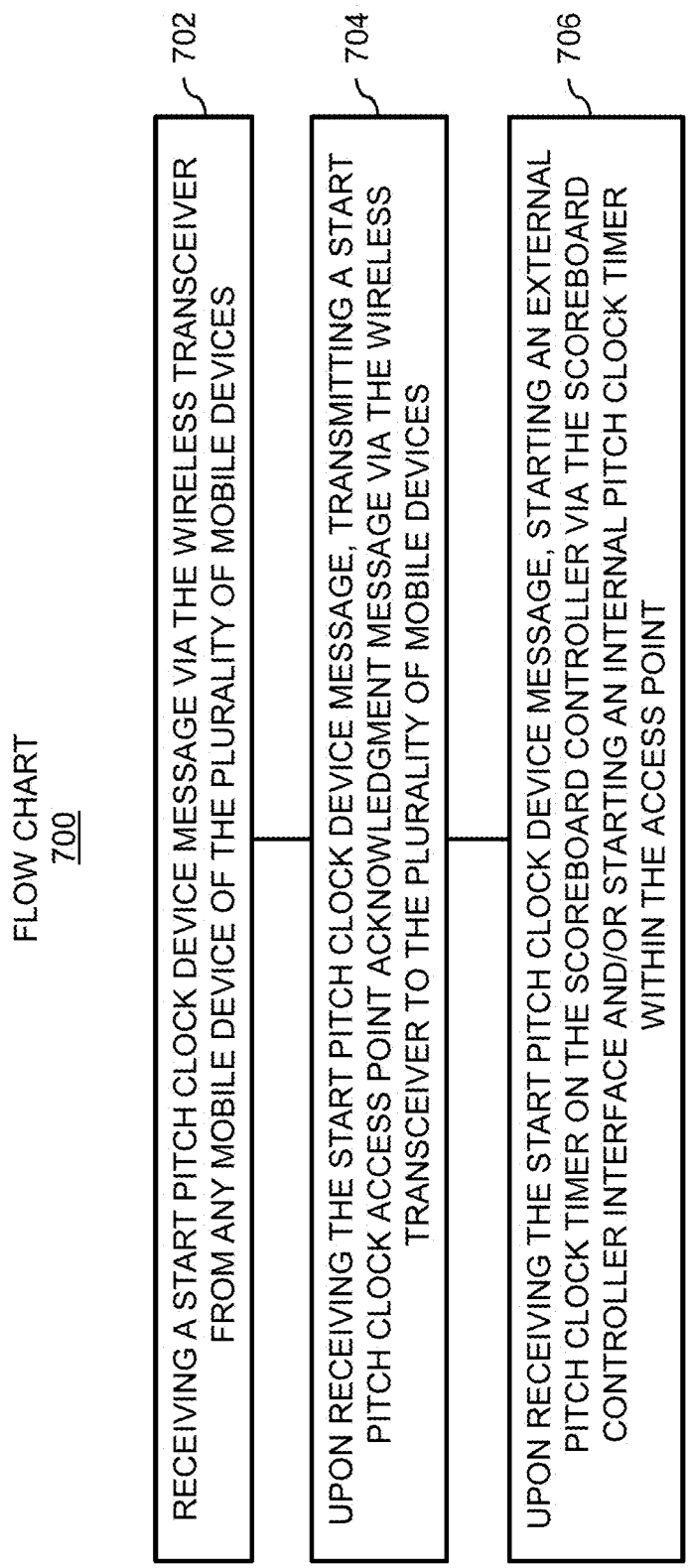
FIG. 7 depicts a flowchart illustrating a method implemented on the access point of FIG. 1, FIG. 4, and FIG. 5 in accordance with embodiments of the present disclosure.

In broader embodiments, FIG. 7 depicts a flowchart 700 illustrating a method implemented on the access point 106 of FIG. 1, FIG. 4, and FIG. 5 in accordance with embodiments of the present disclosure. In step 702, the method includes receiving a start pitch clock device message via the wireless transceiver from any one of the plurality of mobile devices 104A-104D. In step 704, upon receiving the start pitch clock device message from any one of the plurality the mobile devices 104A-104D, transmitting a start pitch clock access point acknowledgment message via the wireless transceiver 508 to the plurality of mobile devices 104A-104d. In step 706, the method further includes upon receiving the start pitch clock device message from any one of the plurality the mobile devices 104A-104D, starting an external pitch clock timer on the scoreboard controller 108 via the scoreboard controller interface 510, and/or starting an internal pitch clock timer within the access point 106.

Figure 8:
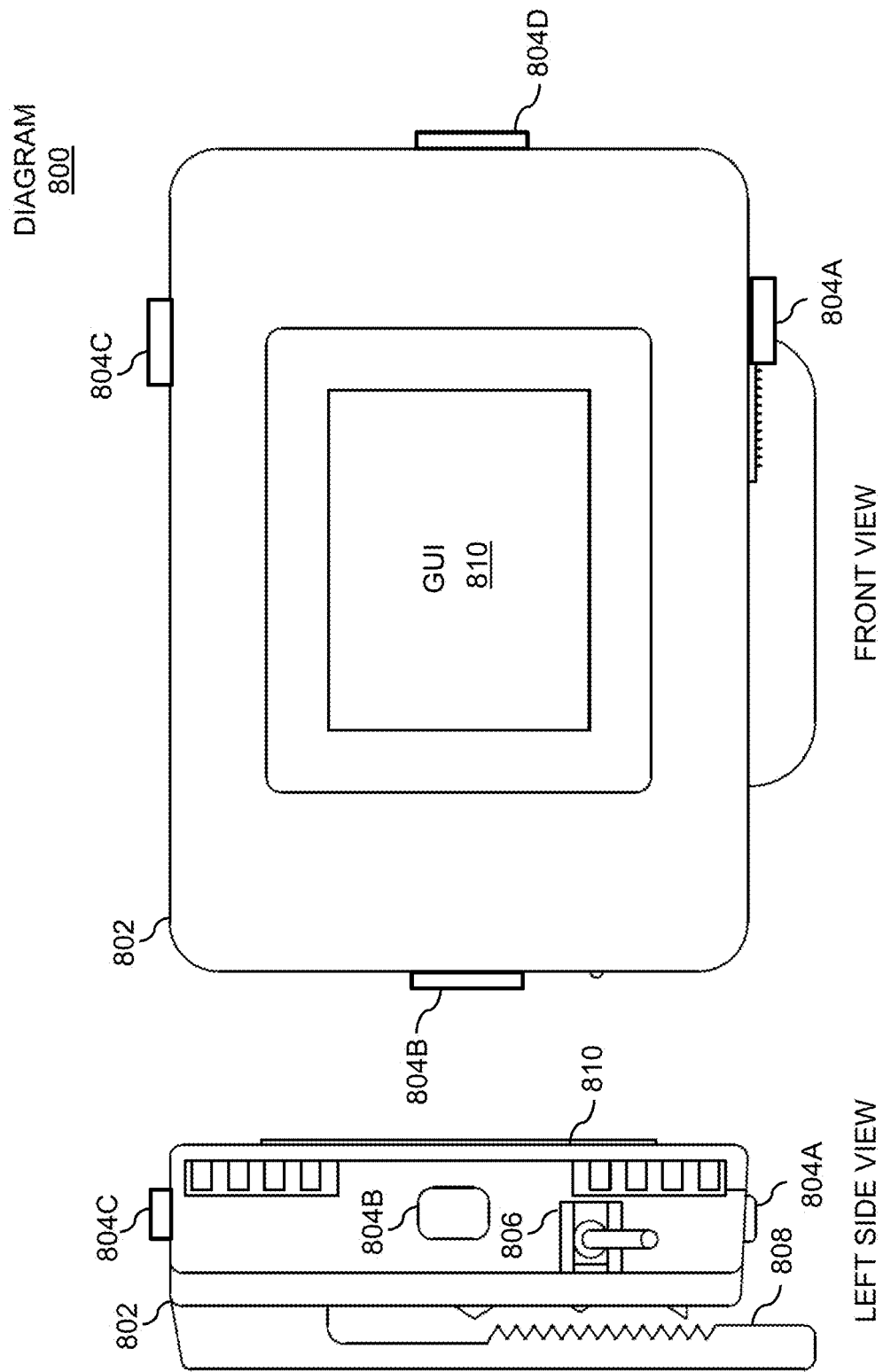
FIG. 8 depicts a diagram illustrating a side view and a front view of another mobile device of FIG. 1 in accordance with embodiments of the present disclosure.

FIG. 8 depicts a diagram 800 illustrating a side view and a front view of a mobile device 802 in accordance with embodiments of the present disclosure. The mobile device 802 is similar to the mobile device 104 of FIG. 2 and block diagram 300 of FIG. 3. The mobile device 802 includes rechargeable lithium batteries and a universal serial bus (USB) charging port. In some embodiments, the mobile device 802 may include a wireless charging port. The mobile device 802 is lightweight and is configured to enter a sleep mode after approximately fifteen minutes of inactivity. The mobile device 802 is configured to save configuration data using onboard flash memory. Configuration data includes an access point ID, a network ID, frequency bands, frequency channels, serial number, and encryption/decryption keys.

The mobile device 802 includes a first timer momentary switch 804A positioned on a bottom side of the mobile device 802. The first timer momentary switch 804A is configured to receive a start first timer selection from an umpire and the device 802 is configured to transmit a start first timer device message via a wireless transceiver within the mobile device 802 to the access point 106. The access point 106 is configured to start or reset/re-start a first timer. The first timer is associated with a league pitch clock time requirement. The first timer may be a count-up timer or a count-down timer. The first timer may be an external first timer within the scoreboard controller 108 or an internal first timer within the access point 106. Upon receiving the start first timer device message, the access point 106 is further configured for resetting the external first timer on the scoreboard controller 108 prior to starting the external first timer and/or resetting the internal first timer within the access point 106 prior to starting the internal first timer. The mobile device 802 is also configured to receive a start first timer access point acknowledgment message from the access point 106 and upon receiving the start first timer access point acknowledgment message, momentarily activate a haptic feedback device (e.g., using a unique start first timer vibration pattern). The first timer is associated with a first timer expiration time interval. The first timer expiration time interval may be field programmable. Additionally, the first timer expiration time interval may be preset to approximately twenty seconds.

The mobile device processor 802 is further configured for receiving a first timer expiration warning message from the access point 106; and momentarily activating the haptic feedback device (e.g., using a unique first timer warning vibration pattern) upon receiving the first timer warning message. The first timer warning message is transmitted from the access point 106 based on a first timer warning time interval. The first timer warning time interval is field programmable. The first timer warning time interval may be associated with a league pitch clock warning time requirement. The first timer warning time interval may be preset to approximately eight seconds.

The mobile device 802 is further configured for receiving a first timer expired message from the access point 106; and momentarily activating the haptic feedback device (e.g., using a unique first timer expired pattern) upon receiving the first timer expired message. Additionally, the first timer expired message may be transmitted from the access point 106 based on the first timer expiration time interval being reached by the first timer.

The mobile device 802 also includes a second timer momentary switch 804B positioned on a left side of the mobile device 802. The second timer momentary switch 804B is configured to receive a start first timer selection from the umpire and the device 802 is configured to transmit a start second timer device message via the wireless transceiver within the mobile device 802 to the access point 106. The access point 106 is configured to start or reset/re-start a second timer. The second timer is associated with a league between inning clock time requirement. The second timer may be a count-up timer or a count-down timer. The second timer may be an external second timer within the scoreboard controller 108 or an internal second timer within the access point 106. Upon receiving the start second timer device message, the access point 106 is further configured for resetting the external second timer on the scoreboard controller 108 prior to starting the external first timer and/or resetting the internal second timer within the access point 106 prior to starting the internal first timer. The mobile device 802 is also configured to receive a start second timer access point acknowledgment message from the access point 106 and upon receiving the start second timer access point acknowledgment message, momentarily activate the haptic feedback device (e.g., using a unique start second timer vibration pattern). The second timer is associated with a second timer expiration time interval. The second timer expiration time interval may be field programmable. Additionally, the second timer expiration time interval may be preset to approximately one hundred twenty seconds.

The mobile device processor 802 is further configured for receiving a second timer expiration warning message from the access point 106; and momentarily activating the haptic feedback device (e.g., using a unique second timer warning vibration pattern) upon receiving the second timer warning message. The second timer warning message is transmitted from the access point 106 based on a second timer warning time interval. The second timer warning time interval is field programmable. The second timer warning time interval may be associated with a league between inning warning time requirement. The second timer warning time interval may be preset to approximately thirty seconds.

The mobile device 802 is further configured for receiving a second timer expired message from the access point 106; and momentarily activating the haptic feedback device (e.g., using a unique second timer expired pattern) upon receiving the second timer expired message. Additionally, the second timer expired message may be transmitted from the access point 106 based on the second timer expiration time interval being reached by the second timer.

The mobile device 802 also includes a third timer momentary switch 804C positioned on a top side of the mobile device 802. The third timer momentary switch 804C is configured to receive a start third timer selection from the umpire and the device 802 is configured to transmit a start third timer device message via the wireless transceiver within the mobile device 802 to the access point 106. The access point 106 is configured to start or reset/re-start a third timer. The third timer is associated with certain league action clock time requirements. The certain league action clock time requirements may include pace-of-play between batters, mound visits, offensive timeouts, and/or the like. The third timer may be a count-up timer or a count-down timer. The third timer may be a count-up timer or a count-down timer. The third timer may be an external third timer within the scoreboard controller 108 or an internal third timer within the access point 106. Upon receiving the start third timer device message, the access point 106 is further configured for resetting the external third timer on the scoreboard controller 108 prior to starting the external first timer and/or resetting the internal third timer within the access point 106 prior to starting the internal first timer. The mobile device 802 is also configured to receive a start third timer access point acknowledgment message from the access point 106 and upon receiving the start third timer access point acknowledgment message, momentarily activate the haptic feedback device (e.g., using a unique start third timer vibration pattern). The third timer is associated with a third timer expiration time interval. The third timer expiration time interval may be field programmable. Additionally, the third timer expiration time interval may be preset to approximately thirty seconds.

The mobile device processor 802 is further configured for receiving a third timer expiration warning message from the access point 106; and momentarily activating the haptic feedback device (e.g., using a unique third timer warning vibration pattern) upon receiving the third timer warning message. The third timer warning message is transmitted from the access point 106 based on a third timer warning time interval. The third timer warning time interval is field programmable. The third timer warning time interval may be associated with certain league action clock time requirements warning time requirements. The third timer warning time interval may be preset to approximately eight seconds.

The mobile device 802 is further configured for receiving a third timer expired message from the access point 106; and momentarily activating the haptic feedback device (e.g., using a unique third timer expired pattern) upon receiving the third timer expired message. Additionally, the third timer expired message may be transmitted from the access point 106 based on the third timer expiration time interval being reached by the third timer.

The mobile device 802 also includes a fourth timer momentary switch 804D positioned on a right side of the mobile device 802. The fourth timer momentary switch 804D is configured to receive a start fourth timer selection from the umpire and the device 802 is configured to transmit a start fourth timer device message via the wireless transceiver within the mobile device 802 to the access point 106. The access point 106 is configured to start or reset/re-start a fourth timer. The fourth timer is associated with a league pitching change clock time requirement. The fourth timer may be a count-up timer or a count-down timer. The fourth timer may be a count-up timer or a count-down timer. The fourth timer may be an external fourth timer within the scoreboard controller 108 or an internal fourth timer within the access point 106. Upon receiving the start fourth timer device message, the access point 106 is further configured for resetting the external fourth timer on the scoreboard controller 108 prior to starting the external fourth timer and/or resetting the internal fourth timer within the access point 106 prior to starting the internal fourth timer. The mobile device 802 is also configured to receive a start fourth timer access point acknowledgment message from the access point 106 and upon receiving the start fourth timer access point acknowledgment message, momentarily activate the haptic feedback device (e.g., using a unique start fourth timer vibration pattern). The fourth timer is associated with a fourth timer expiration time interval. The fourth timer expiration time interval may be field programmable. Additionally, the fourth timer expiration time interval may be preset to approximately one hundred fifty seconds.

The mobile device processor 802 is further configured for receiving a fourth timer expiration warning message from the access point 106; and momentarily activating the haptic feedback device (e.g., using a unique fourth timer warning vibration pattern) upon receiving the fourth timer warning message. The fourth timer warning message is transmitted from the access point 106 based on a fourth timer warning time interval. The fourth timer warning time interval is field programmable. The fourth timer warning time interval may be associated with a league pitching change warning time requirement. The fourth timer warning time interval may be preset to approximately thirty seconds.

The mobile device 802 is further configured for receiving a fourth timer expired message from the access point 106; and momentarily activating the haptic feedback device (e.g., using a unique fourth timer expired pattern) upon receiving the fourth timer expired message. Additionally, the fourth timer expired message may be transmitted from the access point 106 based on the fourth timer expiration time interval being reached by the fourth timer.

Additionally, the mobile device 802 includes a toggle switch 806 and a belt clip 808. The toggle switch 806 may be used as an on/off switch or other function. The toggle switch 806 may also be programmable.

The mobile device 802 also includes a GUI 810. Specifically, the GUI 810 may include a color thin-film transistor (TFT) display with light emitting diode (LED) backlight supporting custom graphics and touch screen. Tilt based operation further conserves battery light by dimming the GUI 810 when not being viewed by an umpire. The GUI 810 may be configured to display a current status of the first timer, the second timer, the third timer, or the fourth timer.

The mobile device 802 may include additional momentary switches, toggle switches, and/or other types of switches on other sides of the mobile device 802 (not shown in FIG. 8). Switches are positioned on the mobile device 104 in such a manner that an umpire can utilize the mobile device 104 while clipped to a belt. The GUI 810 may be used for additional features to facilitate the umpire. For example, an icon on the GUI 810 may launch a stopwatch application. The stopwatch application may use one or more of the switches on the sides of the mobile device 104 or GUI 810 for start, stop, lap, and reset features. The stopwatch application may use haptic feedback to indicate when and which switch was activated and/or a timer expired, such as a countdown feature of the stopwatch.

FIG. 9 depicts a flowchart 900 illustrating a method implemented on the mobile device 802 of FIG. 8 in accordance with embodiments of the present disclosure. In step 902, the method includes receiving a start first timer selection via the first timer momentary switch 804A. In step 904, the method further includes upon receiving the start first timer selection, transmitting a start first timer device message via the wireless transceiver to the access point 106. In step 906, the method further includes receiving a start first timer access point acknowledgment message from the access point 106 via wireless transceiver. In step 908, upon receiving the start first timer access point acknowledgment message, momentarily activating the haptic feedback device.

The access point 106 when communicating with mobile device 802 may implement one or more methods similar to flow chart 700 of FIG. 7 when receiving the start first timer device message. The mobile device may implement one of more additional method similar to flow chart 900 of FIG. 9 in relation to the first, second, third, or fourth timers and the associated methods.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server.

Aspects of the present invention are described in the instant specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device for facilitating an umpire of a baseball game, the mobile device comprising:
   a processor;
   a memory electrically coupled with the processor;
   a user interface electrically coupled with the processor;
   a haptic feedback device electrically coupled with the processor; and
   a wireless transceiver electrically coupled with the processor, wherein the processor is configured for:
   receiving a start pitch clock selection via the user interface;
   upon receiving the start pitch clock selection via the user interface, transmitting a start pitch clock device message via the wireless transceiver to an access point;
   receiving a start pitch clock access point acknowledgment message from the access point;
   upon receiving the start pitch clock access point acknowledgment message, momentarily activating the haptic feedback device, wherein:
   the access point is electrically coupled with a scoreboard controller; and
   the access point is configured for at least one of:
   starting an external pitch clock timer on the scoreboard controller upon receiving the start pitch clock device message; and
   starting an internal pitch clock timer within the access point upon receiving the start pitch clock device message;
   receiving a batter-must-be-in-box message from the access point; and
   momentarily activating the haptic feedback device upon receiving the batter-must-be-in-box message, wherein the batter-must-be-in-box message is transmitted from the access point based on a first time interval after receiving the start pitch clock device message.

2. The mobile device of claim 1, wherein:
   the user interface includes a pitch-clock momentary switch;
   the processor is further configured for receiving the start pitch clock selection via the pitch-clock momentary switch; and
   the first time interval is associated with a league pitch clock time requirement.

3. The mobile device of claim 2, wherein:
   the user interface includes a no-runners-on-base-pitch-clock momentary switch and a runners-on-base-pitch-clock momentary switch;
   the processor is further configured for receiving the start pitch clock selection via either the no-runners-on-base-pitch-clock-momentary switch or the runners-on-base-pitch-clock momentary switch;
   upon receiving the start pitch clock selection via the no-runners-on-base-pitch-clock-momentary switch, the first time interval becomes associated with a league no-runners-on-base pitch clock time requirement; and
   upon receiving the start pitch clock selection via the runners-on-base-pitch-clock-momentary switch, the first time interval becomes associated with a league runners-on-base pitch clock time requirement.

4. The mobile device of claim 1, wherein the processor is further configured for:

receiving a pitch clock expiration message from the access point; and momentarily activating the haptic feedback device upon receiving the pitch clock expiration message, wherein the pitch clock expiration message is transmitted from the access point based on a second time interval after receiving the start pitch clock device message.

5. The mobile device of claim 4, wherein the second time interval is associated with a league pitch clock time requirement.

6. The mobile device of claim 4, wherein:
the second time interval is associated with a league no-runners-on-base pitch clock time requirement; and
the second time interval is associated with a league runners-on-base pitch clock time requirement.

7. The mobile device of claim 1, wherein the processor is further configured for:
receiving a start between-inning clock selection via the user interface;
upon receiving the start between-inning clock selection via the user interface, transmitting a start between-inning clock device message via the wireless transceiver to the access point;
receiving a start between-inning clock access point acknowledgment message from the access point; and
upon receiving the start between-inning clock access point acknowledgment message, momentarily activating the haptic feedback device, wherein the access point is further configured for at least one of:
starting an external between-inning clock timer on the scoreboard controller upon receiving the start between-inning clock device message; and
starting an internal between-inning clock timer within the access point upon receiving the start between inning clock device message.

8. The mobile device of claim 7, wherein the processor is further configured for:
receiving a between-inning warning message from the access point; and
momentarily activating the haptic feedback device upon receiving the between-inning warning message, wherein the between-inning warning message is transmitted from the access point based on a third time interval after receiving the start between-inning clock device message.

9. The mobile device of claim 8, wherein:
the user interface includes a between-inning clock momentary switch;
the processor is further configured for receiving the start between-inning clock selection via between-inning clock momentary switch; and
the third time interval is associated with a league between-inning clock time requirement.

10. The mobile device of claim 8, wherein the processor is further configured for:
receiving a between-inning expiration message from the access point; and
momentarily activating the haptic feedback device upon receiving the between-inning expiration message, wherein:
the between-inning expiration message is transmitted from the access point based on a fourth time interval after receiving the start between-inning clock device message; and
the fourth time interval is associated with a league between-inning clock time requirement.

11. The mobile device of claim 10, wherein the processor is further configured for:
receiving a start between-batter clock selection via the user interface;
upon receiving the start between-batter clock selection via the user interface, transmitting a start between-batter clock device message via the wireless transceiver to the access point;
receiving a start between-batter clock access point acknowledgment message from the access point; and
upon receiving the start between-batter clock access point acknowledgment message, momentarily activating the haptic feedback device, wherein the access point is further configured for at least one of:
starting an external between-batter clock timer on the scoreboard controller upon receiving the start between-batter clock device message; and
starting an internal between-batter clock timer within the access point upon receiving the start between-batter clock device message.

12. The mobile device of claim 11, wherein the processor is further configured for:
receiving a between-batter warning message from the access point; and
momentarily activating the haptic feedback device upon receiving the between-batter warning message, wherein the between-batter warning message is transmitted from the access point based on a fifth time interval after receiving the start between-batter clock device message.

13. The mobile device of claim 12, wherein:
the user interface includes a between-batter clock momentary switch;
the processor is further configured for receiving the start between-batter clock selection via between-batter clock momentary switch; and
the fifth time interval is associated with a league between-batter clock time requirement.

14. The mobile device of claim 12, wherein the processor is further configured for:
receiving a between-batter expiration message from the access point; and
momentarily activating the haptic feedback device upon receiving the between-batter expiration message, wherein:
the between-batter expiration message is transmitted from the access point based on a sixth time interval after receiving the start between-batter clock device message; and
the sixth time interval is associated with a league between-batter clock time requirement.

15. An access point for facilitating a plurality of umpires of a baseball game, the access point comprising:
a processor;
a memory electrically coupled with the processor;
a user interface electrically coupled with the processor;
a scoreboard controller interface electrically coupled with the processor; and
a wireless transceiver electrically coupled with the processor, wherein:
the wireless transceiver is configured for transmitting and receiving signals from a plurality of mobile devices operated by the plurality of umpires;
the processor is configured for:
receiving a start pitch clock device message via the wireless transceiver from each mobile device of the plurality of mobile devices;

upon receiving the start pitch clock device message from any one of the plurality of mobile devices, transmitting a start pitch clock access point acknowledgment message via the wireless transceiver to the plurality of mobile devices, wherein each mobile device of the plurality of mobile devices is configured for momentarily activating a haptic feedback device upon receiving the start pitch clock access point acknowledgment message;

receiving a reset pitch clock device message via the wireless transceiver from each mobile device of the plurality of mobile devices;

upon receiving the reset pitch clock device message from any one of the plurality of mobile devices, transmitting a reset pitch clock access point acknowledgment message via the wireless transceiver to the plurality of mobile devices, wherein each mobile device of the plurality of mobile devices is configured for momentarily activating their haptic feedback device upon receiving the reset pitch clock access point acknowledgment message;

receiving a start between-inning clock device message via the wireless transceiver from each mobile device of the plurality of mobile devices;

upon receiving the start between-inning clock device message from any one of the plurality of mobile devices, transmitting a start between-inning clock access point acknowledgment message via the wireless transceiver to the plurality of mobile devices, wherein each mobile device of the plurality of mobile devices is configured for momentarily activating their haptic feedback device upon receiving the start between-inning clock access point acknowledgment message;

receiving a batter-must-be-in-box scoreboard message from the scoreboard controller interface; and upon receiving the batter-must-be-in-box scoreboard message, transmitting a batter-must-be-in-box access point message via the wireless transceiver to the plurality of mobile devices, wherein:

each mobile device of the plurality of mobile devices is configured for momentarily activating their haptic feedback device upon receiving the batter-must-be-in-box access point message; and the batter-must-be-in-box scoreboard message is transmitted from the scoreboard controller interface based on a first time interval after receiving a start pitch clock access point message;

the processor is further configured for at least one of:

starting an external pitch clock timer on a scoreboard controller via the scoreboard controller interface upon receiving the start pitch clock device message; and starting an internal pitch clock timer within the access point upon receiving the start pitch clock device message;

the processor is further configured for at least one of:

resetting the external pitch clock timer on the scoreboard controller via the scoreboard controller interface upon receiving the reset pitch clock device message; and resetting the internal pitch clock timer within the access point upon receiving the reset pitch clock device message; and the processor is further configured for at least one of:

starting an external between-inning clock timer on the scoreboard controller via the scoreboard controller interface upon receiving the start between-inning clock device message; and starting an internal between-inning clock timer within the access point upon receiving the start between-inning clock device message.

16. The access point of claim 15, wherein the first time interval is approximately ten seconds.

17. The access point of claim 15, wherein the processor is further configured for:

receiving a pitch clock expiration scoreboard message from the scoreboard controller interface; and upon receiving the pitch clock expiration scoreboard message, transmitting a pitch clock expiration access point message via the wireless transceiver to the plurality of mobile devices, wherein:

each mobile device of the plurality of mobile devices is configured for momentarily activating their haptic feedback device upon receiving the pitch clock expiration access point message; and the pitch clock expiration scoreboard message is transmitted from the scoreboard controller based on a second time interval after receiving the start pitch clock access point message.

18. The access point of claim 17, wherein the second time interval is approximately twenty seconds.

19. The access point of claim 17, wherein the processor is further configured for:

receiving a between-inning warning scoreboard message from the scoreboard controller interface; and upon receiving the between-inning warning scoreboard message, transmitting a between-inning warning access point message via the wireless transceiver to the plurality of mobile devices, wherein:

each mobile device of the plurality of mobile devices is configured for momentarily activating their haptic feedback device upon receiving the between-inning warning access point message; and the between-inning warning scoreboard message is transmitted from the scoreboard controller based on a third time interval after receiving a between-inning clock access point message.

20. The access point of claim 19, wherein the third time interval is approximately ninety seconds.

21. The access point of claim 19, wherein the processor is further configured for:

receiving a between-inning expiration scoreboard message from the scoreboard controller interface; and upon receiving the between-inning expiration scoreboard message, transmitting a between-inning expiration access point message via the wireless transceiver to the plurality of mobile devices, wherein:

each mobile device of the plurality of mobile devices is configured for momentarily activating their haptic feedback device upon receiving the between-inning expiration access point message; and the between-inning expiration scoreboard message is transmitted from the scoreboard controller based on a fourth time interval after receiving the between-inning clock access point message.

22. The access point of claim 21, wherein the fourth time interval is approximately one hundred twenty seconds.

23. The access point of claim 21, wherein:

the processor is further configured for:

receiving a start between-batter clock device message via the wireless transceiver from each mobile device of the plurality of mobile devices; and upon receiving the start between-batter clock device message from any one of the plurality of mobile devices, transmitting a start between-batter clock access point acknowledgment message via the wireless transceiver to the plurality of mobile devices, wherein each mobile device of the plurality of mobile devices is configured for momentarily activating their haptic feedback device upon receiving the start between-batter clock access point acknowledgment message; and the processor is further configured for at least one of:

starting an external between-batter clock timer on the scoreboard controller via the scoreboard controller interface upon receiving the start between-batter clock device message; and starting an internal between-batter clock timer within the access point upon receiving the start between-inning clock device message.

24. The access point of claim 23, wherein the processor is further configured for:

receiving a between-batter warning scoreboard message from the scoreboard controller interface; and upon receiving the between-batter warning scoreboard message, transmitting a between-batter warning access point message via the wireless transceiver to the plurality of mobile devices, wherein:

each mobile device of the plurality of mobile devices is configured for momentarily activating their haptic feedback device upon receiving the between-batter warning access point message; and the between-batter warning scoreboard message is transmitted from the scoreboard controller based on a fifth time interval after receiving a between-batter clock access point message.

25. The access point of claim 24, wherein the fifth time interval is approximately twenty-two seconds.

26. The access point of claim 24, wherein the processor is further configured for:

receiving a between-batter expiration scoreboard message from the scoreboard controller interface; and upon receiving the between-batter expiration scoreboard message, transmitting a between-batter expiration access point message via the wireless transceiver to the plurality of mobile devices, wherein:

each mobile device of the plurality of mobile devices may be configured for momentarily activating their haptic feedback device upon receiving the between-batter expiration access point message; and the between-batter expiration scoreboard message is transmitted from the scoreboard controller based on a sixth time interval after receiving the between-batter clock access point message.

27. The access point of claim 26, wherein the sixth time interval is approximately thirty seconds.

* * * * *